(12) United States Patent
McLean et al.

(10) Patent No.: US 7,389,260 B1
(45) Date of Patent: Jun. 17, 2008

(54) CONTINUOUSLY UPDATED DATA PROCESSING METHOD FOR MEASURING FINANCIAL VALUE CREATION

(75) Inventors: Robert I. G. McLean, Colborne (CA); Rodney J. Anderson, Cobourg (CA)

(73) Assignee: TVC International Inc., Toronto, Ontario (CA)

( * ) Notice: Subject to any disclaimer, the term of this patent is extended or adjusted under 35 U.S.C. 154(b) by 0 days.

(21) Appl. No.: 09/574,569

(22) Filed: May 17, 2000

(51) Int. Cl.
*G06Q 40/00* (2006.01)

(52) U.S. Cl. ............................... 705/36; 705/35; 705/1; 395/240; 395/3

(58) Field of Classification Search .................... 705/4, 705/7, 35–37, 6, 8, 11, 40, 10, 400, 1; 707/104.1; 463/17; 700/99; 706/52, 23, 13; 395/3, 395/240

See application file for complete search history.

(56) References Cited

U.S. PATENT DOCUMENTS

| | | | | | |
|---|---|---|---|---|---|
| 5,574,826 | A | * | 11/1996 | Russo et al. | 706/4 |
| 5,644,727 | A | * | 7/1997 | Atkins | 705/40 |
| 5,812,988 | A | * | 9/1998 | Sandretto | 705/36 R |
| 5,893,072 | A | * | 4/1999 | Zizzamia | 705/4 |
| 6,016,480 | A | * | 1/2000 | Houvener et al. | 705/21 |
| 6,321,205 | B1 | * | 11/2001 | Eder | 705/7 |
| 6,363,333 | B1 | * | 3/2002 | Deco et al. | 702/191 |
| 6,411,936 | B1 | * | 6/2002 | Sanders | 705/10 |
| 6,456,982 | B1 | * | 9/2002 | Pilipovic | 705/36 |
| 6,792,399 | B1 | * | 9/2004 | Phillips et al. | 705/36 R |

(Continued)

OTHER PUBLICATIONS

Gordon et al, 2nd edition (1994) and 3rd edition (2000) "Valuation of Intellectual Property and Intangible Assets", selected pages only.*

(Continued)

*Primary Examiner*—Harish T. Dass
(74) *Attorney, Agent, or Firm*—DLA Piper US LLP

(57) ABSTRACT

A data processing method and system that measures performance in creating value by a business enterprise based upon past and anticipated future events. Continuously updated measurements of the present value of future financial value streams of the business enterprise are derived from event-driven discounted cash flow analysis. Measures of value creation performance are not dependent upon transactions with third parties. Rather, anticipated benefits from activities of the business enterprise are taken into account. Strategic planning may be accomplished, while past value creation performance may be evaluated on an ongoing basis. A data structure is developed that includes one or more assumed variables that have an influence on a future financial value stream of the business enterprise and at least one future or past event for each assumed variable that influences the corresponding assumed variable. A first present value of the future financial value stream is determined by aggregating the influences on the future financial value stream attributable to the assumed variables and adjusting the future financial value stream for a time value of money. In response to the occurrence or non-occurrence of one or more of the future events, a determination is made as to whether one or more of the assumed variables have changed and whether the influenced future financial value stream has changed. A second present value of the future financial value stream is determined taking into account the one or more assumed variables that changed in response to the occurrence or non-occurrence of the one or more of the future events.

52 Claims, 13 Drawing Sheets

U.S. PATENT DOCUMENTS

2005/0119922 A1* 6/2005 Eder .............................. 705/7

OTHER PUBLICATIONS

Financial Management—By Jae K. Shim and Joel G. Siegel, second Edition publisher, BARRON'S, 2000, total of 11 pages. ISBN 0-7641-1402-6.*

Gushee, fifth edition (1971) "Financial Compound Interest and Annuity Tables"financial Publishing Company, Publication No. 376 (provided by Applicant, Exhibit A).*

Chriss (1997) "Black-Scholes and Beyond Otion Pricing Models", McGraw-Hill (provided by Applicant, Exhibit B).*

Steven N.Kaplan and Richard S Ruback "The valuation of cash flow forecasts: An Empirical Analysis", The Journal of Finance, vol. 50, No. 4 (Sep. 1995, pp. 1059-1093.*

* cited by examiner

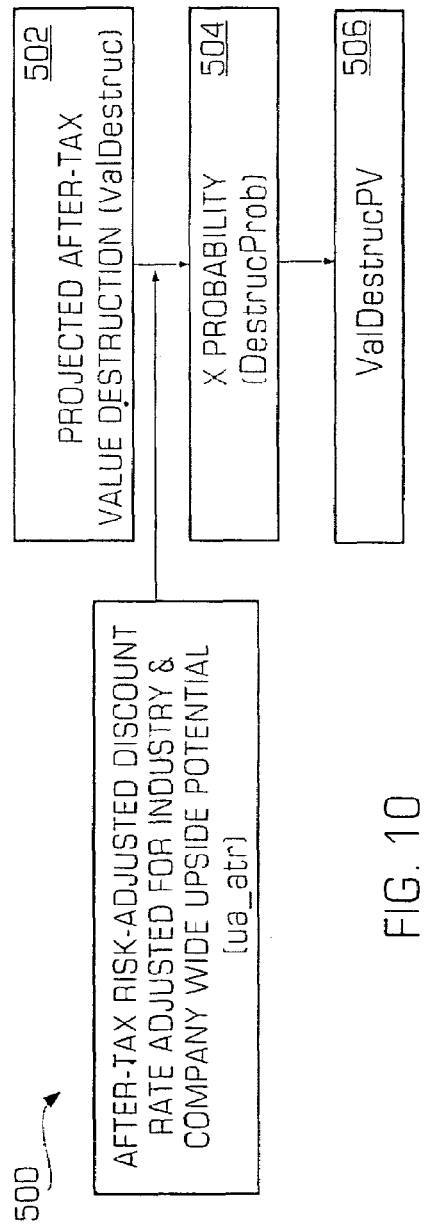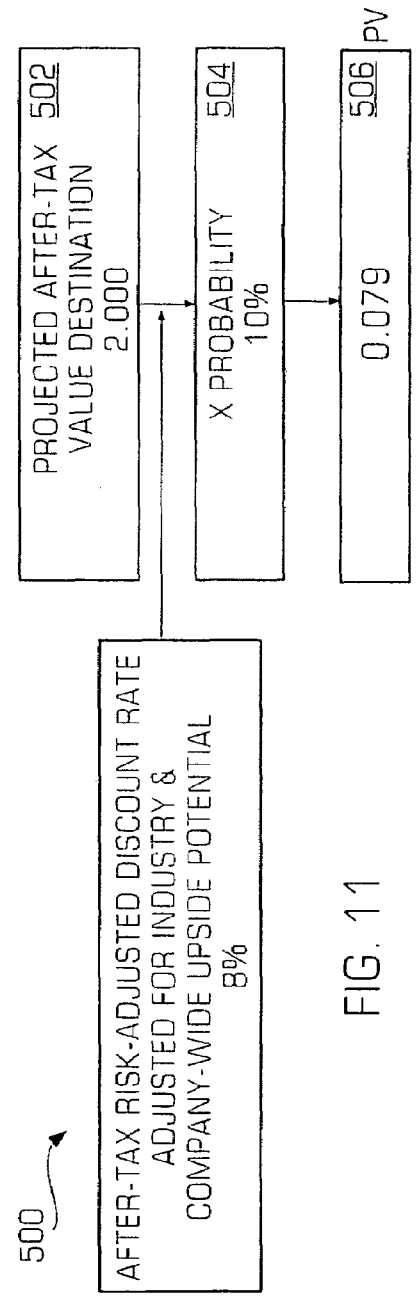
FIG. 10
FIG. 11

CALCULATION OF OUTCOME VARIANCE

| | |
|---|---|
| PV OF BIO-TECH DRUG PROJECTS | 468.999 |
| PV OF BIO-INFORMATICS TOOLS | 134.424 |
| FREE CASH PV | 2.649 |
| CURRENT PV OF GREENGENE | 600.774 |
| LAST YEAR'S PV | 471.418 |
| DELTA_PV | 129.356 |
| CoCr ON LAST YR PV | 75.427 |
| OUTCOME VARIANCE | 53.929 |

ANALYSIS OF OUTCOME VARIANCE

| CAUSE | EFFECT $ MLNS |
|---|---|
| REVISED PROJECTION TOOL #4 SALES FROM 0.017% TO 0.015% | 25.009 |
| WORLD BIO-TECH SALES GROWTH THRU 2005 FROM 11.5% TO 12.5% | 14.931 |
| REVISED PROJECTION DRUG #26 SALES FROM 0.45% TO 0.70% | 10.196 |
| LAST YR WORLD SALES GREW 12.9% NOT 11.5% | 7.000 |
| INCREASED R&D SPENDING LAST YEAR | -1.607 |
| INCREASED FUTURE R&D SPENDING | -1.461 |
| EFFECT OF WHO DONATION | -0.306 |
| LAST YR'S INVESTMENT INCOME BETTER | 0.167 |
| | 53.929 |

FIG. 13

CONTINUOUSLY UPDATED DATA PROCESSING METHOD FOR MEASURING FINANCIAL VALUE CREATION

BACKGROUND OF THE INVENTION

The present invention relates to a data processing system that measures performance in creating value by a business enterprise based upon past and anticipated future events. More particularly, the present invention relates to a data processing system that provides continuously updated measurements of the present value of future financial value streams of a business enterprise derived from event-driven discounted cash flow analysis.

A fundamental principle of traditional accounting and financial reporting methods is that the performance of a business enterprise is derived from transactions between the enterprise and other parties, such as customers, suppliers and employees. Consequently, traditional accounting can be characterized as measuring value realized through such transactions.

This arrangement proved to be satisfactory through what can be characterized as the manufacturing era. In today's world, however, the most important assets of many enterprises are not plant and equipment but rather knowledge, ideas and skills. For the most part, knowledge-based assets are not acquired through third-party transactions, but are rather developed in-house. As such, they are not adequately captured by traditional accounting methods.

As a result of these shortcomings of traditional accounting with respect to knowledge intensive companies, it is apparent that capital markets are missing important information needed to rationally assess the performance of a business enterprise. It has been argued that traditional accounting methods are a declining predictor of stock prices and produce largely irrelevant reports for companies with long research and development pipelines. Without adequate accounting for knowledge-intensive enterprises, capital markets will perform sub-optimal resource allocation.

Many recent developments have taken place in the field of accounting and financial reporting though none fully addresses these problems. These include: Economic Value Added (EVA); Balanced Scorecard, Intellectual Capital Management (ICM), Economic Resource Planning (ERP); and Global Reporting Initiative (GRI). An attempt has been made to mitigate some of traditional accounting's shortcomings with management's discussion and analysis (MD&A) sections in annual reports, but MD&A disclosure is itself in bad condition, with no clear standards, methodology, or reporting principles. Capital markets are not routinely supplied with information that would permit monitoring of strategy implementation, value creation, and risk management.

Thus, with the increased time-lag often found between value creation and value realization, an accounting model that focuses only on the latter is increasingly irrelevant for intensively knowledge-based enterprises—and, indeed, enterprises in general are increasingly knowledge-based. Traditional financial statements have simply not provided sufficient information about knowledge assets.

When value creation was closely followed by value realization (the mouse trap was manufactured in March and sold in April) concentrating on just value realization alone was good enough. It is no longer good enough today. A biopharmaceutical research company may spend research and development funds on a potential drug discovery for ten years before successful commercialization and revenue streams commence. The growing deficits resulting from research and development write-offs displayed by traditional accounting during those ten years do not convey timely and relevant information. It is not that traditional accounting methods focussed on value realization should be abandoned. They are important, but they are not sufficient.

Therefore, what is needed is a technique for providing measurements of the performance of a business enterprise in creating value based upon projections of future events and related benefits that will result from such events. More particularly, what is needed is a technique for providing continuously updated measurements of the value creation performance of a business enterprise derived from event-driven discounted cash flow analysis. It is to these ends that the present invention is directed.

SUMMARY OF THE INVENTION

The present invention provides a data processing method that measures performance in creating value by a business enterprise based upon past and anticipated future events. The data processing method preferably provides continuously updated measurements of the present value of future financial value streams of the business enterprise derived from event-driven discounted cash flow analysis.

In contrast to conventional accounting techniques, the present invention provides measures of value creation performance that are not solely dependent upon the occurrence of transactions between the business enterprise and third parties. Rather, the present invention takes into account anticipated benefits from activities undertaken by the business enterprise. A system is provided by which strategic planning for the enterprise may be accomplished. In addition, past value creation performance of the enterprise may also be evaluated on an ongoing basis.

In accordance with an aspect of the present invention, data relating to the performance of a business enterprise in creating value is processed. A data structure is developed. The data structure includes one or more assumed variables that have an influence on a future financial value stream of the business enterprise and at least one future or past event for each assumed variable that influences the corresponding assumed variable. A first present value of the future financial value stream of the business enterprise is determined by aggregating the influences on the future financial value stream attributable to the assumed variables and adjusting the future financial value stream for a time value of money. In response to the occurrence or non-occurrence of one or more of the future events, a determination is made as to whether one or more of the assumed variables have changed and whether the influenced future financial value stream has changed. A second present value of the future financial value stream is determined taking into account the one or more assumed variables that changed in response to the occurrence or non-occurrence of the one or more of the future events.

In accordance with another aspect of the invention, a data structure is developed. The data structure includes a plurality of future financial value streams, each future financial value stream having one or more assumed variables that have an influence on a future financial value stream of the business enterprise and at least one future or past event for each assumed variable that influences the corresponding assumed variable. A present value of each future financial value stream is determined by aggregating the influences on the future financial value stream attributable to the assumed variables of each future financial value stream and adjusting the future financial value streams for a time value of money. The present value of each future financial value stream is aggregated, to form a first aggregate present financial value of the plurality of future financial values streams. In response to the occurrence or non-occurrence of one or more of the future events for one or more of the future financial value streams, a determination is made whether one or more of the assumed variables have changed and whether the influenced future financial value stream has changed. A second aggregate present value of the plurality of future financial value streams is formed taking into account the one or more assumed variables that changed in response to the occurrence or non-occurrence of the one or more of the future events.

In accordance with yet another aspect of the invention, data structure is developed. The data structure includes one or more assumed variables that have an influence on a future financial value stream of the business enterprise and at least one future or past event for each assumed variable that influences the corresponding assumed variable. A first present value of the future financial value stream the business enterprise is determined as of a first specified date by aggregating the influences on the future financial value stream attributable to the assumed variables and adjusting the future financial value stream for a time value of money. A second present value of the future financial value stream of the business enterprise is determined as of a second specified date by aggregating the influences on the future financial value stream attributable to the assumed variables and adjusting the future financial value stream for a time value of money. A variance between the first present value and the second present value is determined taking into account a time value of money between the first and second dates The variance between the first present value and the second present value is attributed to events that occurred between the first and second specified dates.

In accordance with a further aspect of the invention, data relating to the performance of a business enterprise in creating value is processed. A stakeholder perspective is selected from among a plurality of stakeholder perspectives for determining a present value of a future financial value stream of the business enterprise. A data structure including one or more assumed variables that have an influence on the future financial value stream of the business enterprise is developed from the perspective of the selected stakeholder and at least one future or past event for each assumed variable that influences the corresponding assumed variable. A present value of the future financial value stream of the business enterprise is determined from the perspective of the selected stakeholder by aggregating the influences on the future financial value stream attributable to the assumed variables and adjusting the future financial value stream for a time value of money.

In accordance with another aspect of the invention, a data structure is developed. The data structure includes one or more assumed variables that have an influence on a future financial value stream of the business enterprise and at least one future or past event for each assumed variable that influences the corresponding assumed variable. Risks specific to the future financial value stream are identified and segregated from risks specific to the business enterprise or industry as a whole. Probabilities are assigned to the events or assumed variables based on the identified risks. A first present value of the future financial value stream for the business enterprise is determined by aggregating the influences on the future financial value stream attributable to the assumed variables, adjusting the future financial value stream by the assigned probabilities, and further adjusting the future financial value stream for a time value of money. In response to the occurrence or non-occurrence of one or more of the future events, a determination is made as to whether one or more of the assumed variables have changed and whether the influenced future financial value stream has changed. A second present value of the future financial value stream is determined taking into account the one or more assumed variables that changed in response to the occurrence or non-occurrence of the one or more of the future events.

In accordance with yet another aspect of the invention, a data structure is developed. The data structure includes one or more assumed variables that have an influence on a future financial value stream of the business enterprise and at least one future or past event for each assumed variable that influences the corresponding assumed variable. A present value of the future financial value stream of the business enterprise is determined by aggregating the influences one the future financial value stream attributable to the assumed variables and adjusting the future financial value stream for a time value of money. The events and assumed variables collectively form a base case scenario for the business enterprise. The first present value of the future financial value stream is based upon the base case scenario. One or more of the assumed variables is changed to form an alternate scenario including the changed assumed variables. The present value of the future financial value stream is determined based upon the alternate scenario. The present value of the future financial value stream based upon the alternate scenario is compared to the first present value of the future financial value stream based upon the base case scenario.

In accordance with a further aspect of the invention, data relating to the performance of a business enterprise in creating value is processed. A data structure is developed. The data structure includes one or more assumed variables that have an influence on a future financial value stream of the business enterprise and at least one future or past event for each assumed variable that influences the corresponding assumed variable. A first present value of the future financial value stream for the business enterprise is determined by aggregating the influences on the future financial value attributable to the assumed variables and adjusting the future financial value for a time value of money. A series of updated present values of the future financial value stream are repeatedly determined and presented. Each updated present value is determined from the events and assumed variables in the data structure including any assumed variables that have changed in response to the occurrence or non-occurrence of one or more of the future events.

The first present value may be determined by adjusting the future financial value stream by an assessed probability that the influences on the future financial value stream will be realized. In addition, the second present value may be determined by adjusting the future financial value stream by an assessed probability that the influences on the future financial value stream will be realized, taking into account an assessed probability that changed in response to the occurrence or non-occurrence of the one or more of the future events.

The future financial value stream may be associated with activities of the business enterprise necessary to give rise to the events associated with the future financial value stream. A present value of the future financial value stream may be determined by aggregating influences on the future financial value stream attributable to past events. In addition, a reliability index may be determined that is indicative of relative magnitudes of the present value of the future financial value stream attributable to past events and the present value of the future financial value stream attributable to future events.

The events and assumed variables may collectively form a base case scenario for the business enterprise. The first present value of the future financial value stream may be based upon the base case scenario, in which case, the method may also include: changing one or more of the assumed variables, thereby forming an alternate scenario including the changed assumed variables; determining the present value of the future financial value stream based upon the alternate scenario; and comparing the present value of the future financial value stream based upon the alternate scenario to the first present value of the future financial value stream based upon the base case scenario.

A stakeholder perspective may be selected from among a plurality of stakeholder perspectives for determining the first and second present values of the future financial value stream. Two or more stakeholder perspectives may be selected from among a plurality of stakeholder perspectives for determining the first and second present values of the future financial value stream.

The first present value may be determined with respect to a first date. The second present value may be determined with respect to a second date. A variance between the first present value and the second present value may be determined taking into account the time value of money between the first and second dates. The variance between the first present value and the second present value may be attributed to events that occurred between the first and second dates.

BRIEF DESCRIPTION OF THE DRAWINGS

FIG. 10 illustrates a flow diagram for determining the effect on present value based on value destruction and its related probability in accordance with the present invention;

FIG. 11 illustrates the flow diagram of FIG. 10 including an exemplary value destruction and related probability;

FIG. 13 illustrates an exemplary determination of outcome variance;

DETAILED DESCRIPTION OF A PREFERRED EMBODIMENT

Figure 1:
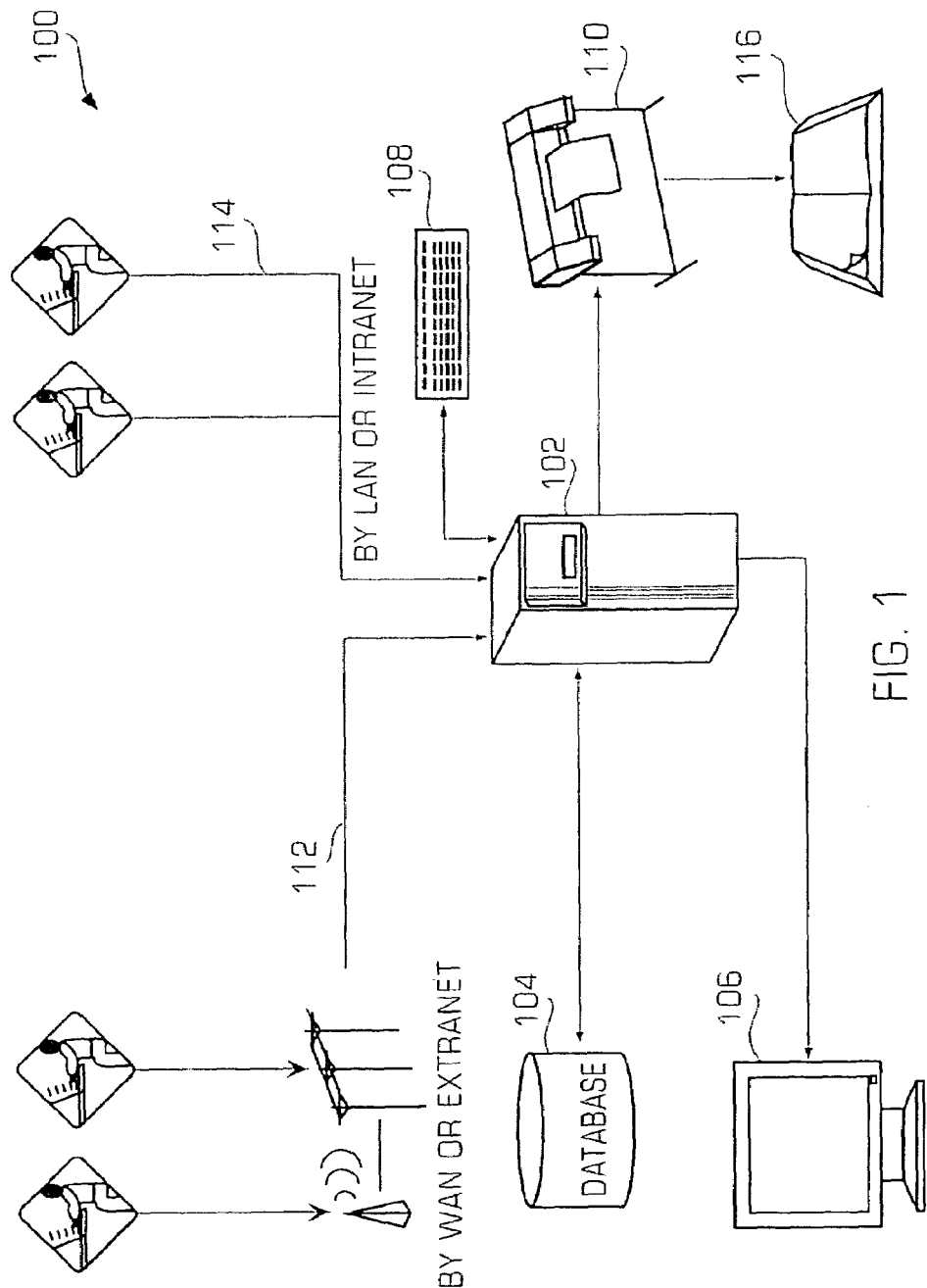
FIG. 1 illustrates a block diagrammatic view of a computer network system in accordance with the present invention.

FIG. 1 illustrates a block diagrammatic view of a computer network system 100 in accordance with the present invention. The system 100 may include a central processing unit (CPU) 102, a database 104, a display 106, a keyboard and mouse 108, a printer 110 and may interface with remote systems via a wide area network (WAN) or extranet 112 and local area network (LAN) or intranet 114. Printed reports 116 may be provided by the printer 110.

Users may access the system 100 directly using the keyboard 108 and monitor 106, or remotely over the LAN or intranet 114, the WAN or extranet 112, or the World Wide Web. Results can be displayed on the local monitor 106, or printed by the local printer 110. Alternately, the results can be displayed by a remote computer monitor or printer (not shown).

It will be apparent that the computer network system 100 is conventional and that various modifications or substitutions may be made. The system 100 may embody the present invention by configuring the CPU 102 to operate in accordance with stored software programs so as to interact with data stored in the database 104, as explained herein.

Data that is relevant to performance of a business enterprise may maintained in the database 104 (FIG. 1). As used herein, "business enterprise" is intended to encompass for profit, not-for-profit and governmental organizations. The database 104 may be in form of a relational database. Input and output from the database 104 may be in the context of one of four different "perspectives" into the data (e.g., each perspective may be an organization or arrangement of the data). These perspectives may include: a perspective that reflects the company's strategy for creating and realizing value, referred to herein as the value creation and realization formula; a value stream perspective; a value creation capacity perspective; and a value creation for multiple stakeholders perspective.

The value creation and realization formula perspective provides a succinct overview of the business enterprise's strategy for creating and realizing value. This can include, for example, an identification of the goods or services to be provided by the business, an identification of the enterprise's position in any related value chain, an identification of the enterprise's strategy with respect to alliances, an identification of the enterprise's approach to financing its present and future operations, an identification of likely consumers of the goods or services, an identification of various markets to be entered and a time schedule in which those markets are anticipated to be entered. Thus, the database 104 may store such parameters in a matrix referred to herein as the formula matrix.

The value stream model perspective is described in more detail herein and relates to performance measurement of the business enterprise with respect to future value creation. This may include, for example, storing measurements of present financial value of one or more value streams of the business enterprise based upon projections of future events, including assumptions (e.g., assumed variables) regarding the future events, probabilities of their occurrence and monetary amounts expected to be realized should they occur.

For the purposes of this document, a "value stream" for a business enterprise is an aggregation of financial and non-financial benefits flowing to the business and arising from a minimum set of activities that are necessary to give rise to the benefits. A "future value stream" refers to those benefits which have not yet occurred with respect to a particular point in time, such as the present. An "historical value stream"

refers to those benefits that have already been realized with respect to a particular point in time. A "financial value stream" refers to those benefits that are reducible to cash or cash equivalents. A "non-financial value stream" refers to those benefits which are not readily reducible to cash and cash equivalents. For example, a non-financial benefit may be enhanced customer loyalty. In addition to benefits, a value stream may have associated costs, such as cash outflows.

Events give rise to the benefits associated with value streams. An historical event may give rise to a benefit that has already been realized with respect to a particular point in time. For example, a sale of goods in the past (an historical event) may have already resulted in a financial benefit to the seller of the goods, in which case, the benefit belongs to an historical value stream. In addition, historical events may result in a benefit that has yet to be realized. For example, a license agreement already entered into (an historical event) may result in periodic payments that are not yet payable with respect to a particular point in time, in which case, these benefits are part of a future value stream. A series of related events are referred to herein as an "event stream." The database 104 may store parameters relating to events, benefits and value streams in a matrix referred to herein as the event matrix.

The value creation capacity perspective relates to the capabilities, infrastructure and network required by the business enterprise for carrying out its strategy for creating and realizing value. Value creation capabilities may include, for example, manufacturing capability and innovation capability. The value creation infrastructure may include, for example, office space and capital equipment, such as telephone and computer systems. The value creation network may include, for example, relationships with other business enterprises, such as suppliers, customers and distributors. Thus, the database 104 may store such parameters in a matrix referred to herein as the capacity matrix.

The value creation for multiple stakeholders perspective relates to measurement of financial and non-financial value creation for key stakeholders. For example, a key stakeholder may be a shareholder in the business enterprise, in which case, the shareholder may be provided with measurements and analysis of financial value of the enterprise based upon future events. As another example, the stakeholder may be one of the business enterprise's customers. In which case, customers may be periodically surveyed to identify their expectations with regard to value creation and their level of satisfaction. The results of the survey may be stored in the database 104 and tracked over time so that trends in the survey results may be analyzed. It will be apparent that data relevant to other types of stakeholders, such as employees, suppliers and business partners, or the community or society at large, may be included in the database 104. The database 104 may store such parameters in a matrix referred to herein as the stakeholders' matrix.

While data in the database 104 can be accessed from any of these perspectives as appropriate, for convenience, a specific dataset (e.g., a collection of assumed variables and events) is primarily associated with each particular perspective. Thus, a unique data structure or matrix may be associated with each of the four different perspectives.

Figure 2:
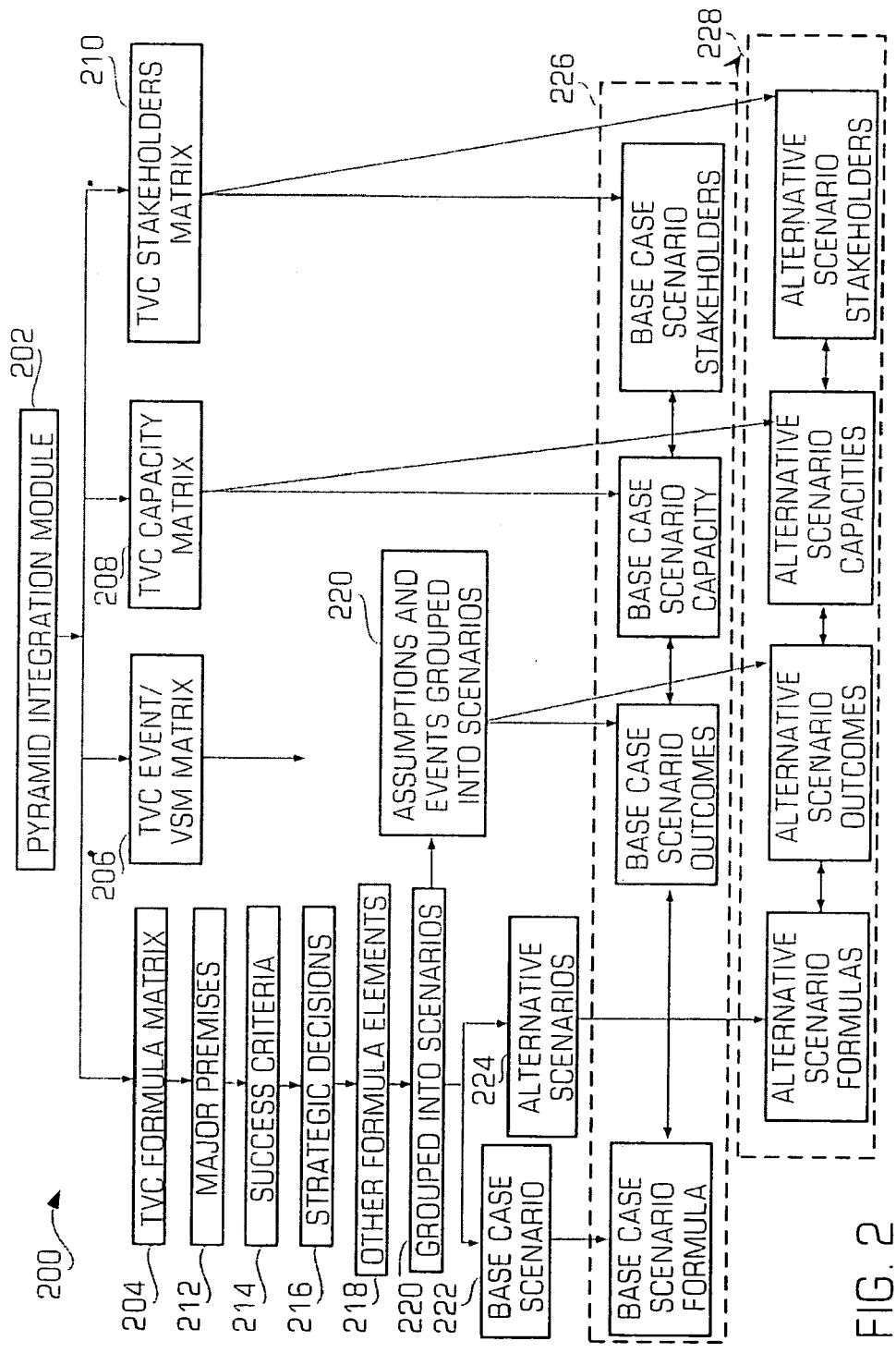
FIG. 2 illustrates a block diagrammatic view of software architecture for the computer system of FIG. 1 in accordance with the present invention.

FIG. 2 illustrates a block diagrammatic view of a software architecture 200 in accordance with the present invention for the computer system 100 of FIG. 1. The software architecture 200 includes a number of software modules 202-220, each of which controls the CPU 102 to perform certain functions, as explained herein. An integration module 202 provides reconciles the four different perspectives and transfers information among them. Thus, for example, if data stored in the matrix associated with the value creation formula perspective is changed, the integration module 202 ensures that corresponding data stored in the matrices associated with the other perspectives is appropriately updated. As shown in FIG. 2, the integration module 202 interfaces with a formula matrix module 204, an event matrix module 206, a capacity matrix module 208 and a stakeholders' matrix module 210.

The formula matrix module 204 manages the data matrix stored in the database 104 (FIG. 1) which is relevant to the formulation of a strategy for the business in creating and realizing value. The event matrix module 206 manages the data matrix stored in the database 104 which is relevant to the value stream model perspective. The capacity matrix module 208 manages the data matrix stored in the database 104 which is relevant to the value creation capacity perspective. The stakeholders' matrix module 210 manages data stored in the matrix that is relevant to the multiple stakeholders' perspective.

The formula matrix module 204 interfaces with a major premises module 212. The major premises module 212 allows a user to input and alter assumed variables stored in the database 104 (FIG. 1). These may be, for example, assumptions regarding the industry of which the business enterprise is a part. The major premises module 212 also interfaces with a success criteria module 214 that allows a user to input and alter measures of success for the business enterprise.

The major premises module 214 also interfaces with a strategic decisions module 216. The strategic decisions module 216 allows a user to define different decision trees, within the data matrix associated with the formula matrix module 204, which depend upon various strategic options available to management of the business enterprise. The strategic decisions module 218 also interfaces with an other formula elements module 218 that allows a user to input and alter other criteria relevant to evaluation of the value creation performance of the business enterprise.

The other formula elements module 218 also interfaces with a scenario grouping module 220. The scenario grouping module 220 allows a user to assemble existing data and to add additional data representative of alternate scenarios for the future of the business enterprise. For example, a base case scenario 222 may be established by a particular assemblage of events and related assumptions (e.g., assumed variables) for the business enterprise. For example, the base case scenario may include a current operational scenario that the business enterprise is implementing. One or more additional alternate scenarios 224 may also be established including a different set of events and related assumptions for each alternate scenario. For example, the alternate scenarios may be under consideration for possible future adoption by the enterprise.

Thus, the system 100 (FIG. 1) provides an ability to analyze scenarios, consisting of particular groupings of events and related assumptions. As a result, a user may be provided with a plurality of outcomes 226 for the base case scenario, taken from each of the four perspectives. In addition, the user may be provided with a plurality of alternate outcomes 228 for each alternate scenario.

As is described herein, the same underlying determinations made by the system 100 can be deployed in two principal "contexts" (e.g., conditions under which the determinations are employed). In a first context, the system 100 generates comparisons between the base case and alternative future scenarios. Thus, the first context facilitates the choice of an optimal future scenario to maximize value creation of the business enterprise. Accordingly, the first context is particularly useful for strategic planning. In a second context, the system 100 compares the organization's actual value creation performance during a period of time to the performance predicted at the beginning of that time period. Thus, in the second context, the value creation performance of the business enterprise may be evaluated with the benefit of hindsight and measured against value creation that was previously predicted for the enterprise.

Figure 3:
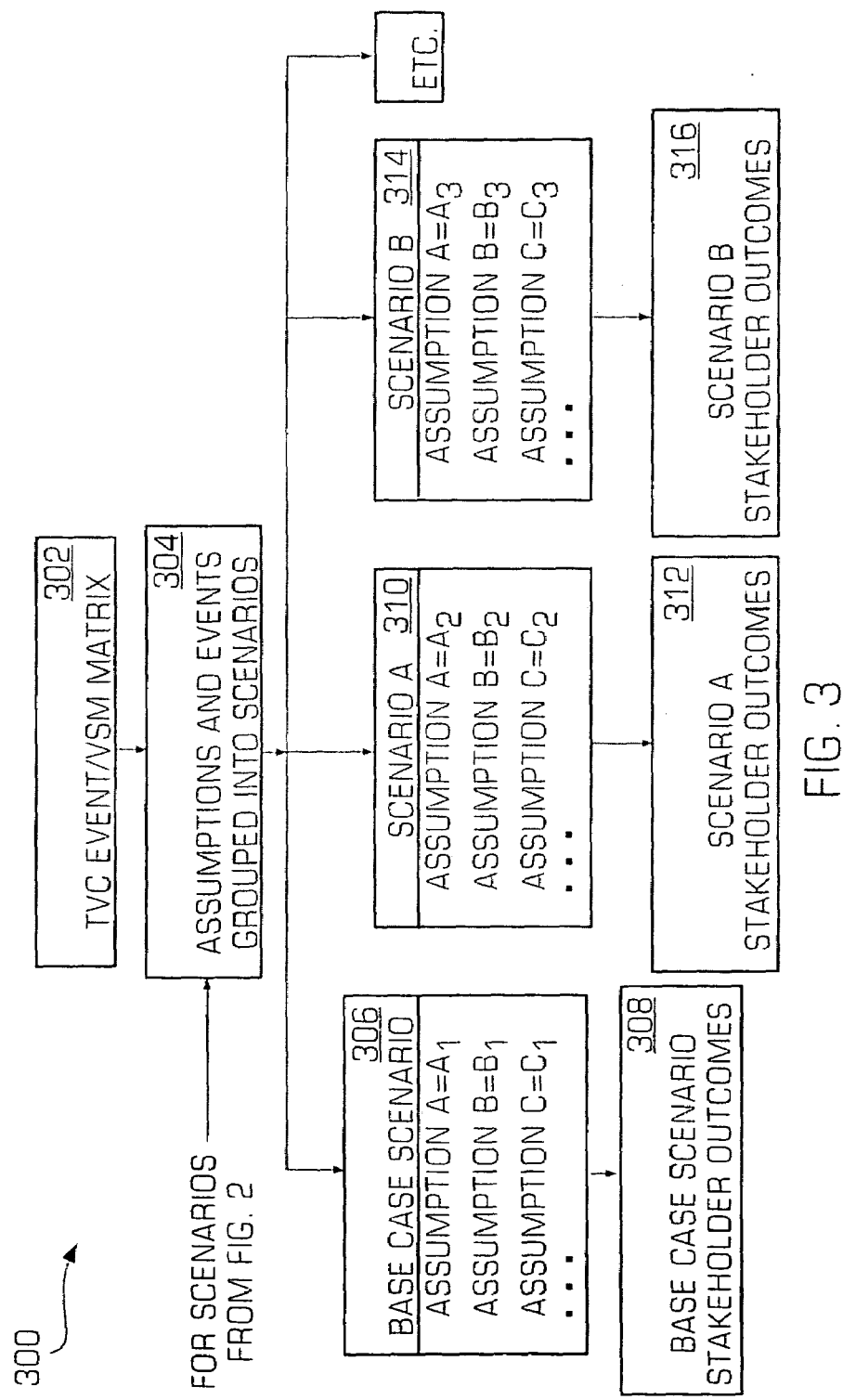
FIG. 3 illustrates a flow diagram showing determination of outcomes based upon different assumptions.

FIG. 3 illustrates a flow diagram 300 showing determination of outcomes based upon different assumptions. For example, the CPU 102 can be controlled to determine the outcomes 226 (FIG. 2) from the groups of scenarios 220 (FIG. 2) in accordance with the flow diagram 300 of FIG. 3. In a state 302, data relevant to the various scenarios may be retrieved from the database 104 (FIG. 1) to the CPU 102 (FIG. 2). Then, in a state 304, the data for the assumptions and their related events may be assembled into scenarios.

As explained above, the event matrix stored in the database 104 is a relational database in which assumptions (e.g., assumed variables), events, and their related probabilities are collected and grouped into the various base case and alternative scenarios. Some assumptions may be scenario-independent and, thus, are constant throughout all the scenarios. Other assumptions, however, may vary scenario by scenario. Thus, for example, an assumption ("Assumption a") may be set at value $a_1$ in the base case scenario, at value $a_2$ in a first alternate scenario ("Scenario A"), and at value $a_3$ in yet another alternate scenario ("Scenario B"). Each of the scenarios yields "scenario stakeholder outcomes" as further described below. The scenario stakeholder outcomes (and how they vary over time) for the base case may be used for performance tracking. The other scenario outcomes may be used as "what-if" comparisons for strategic planning.

Figure 4:
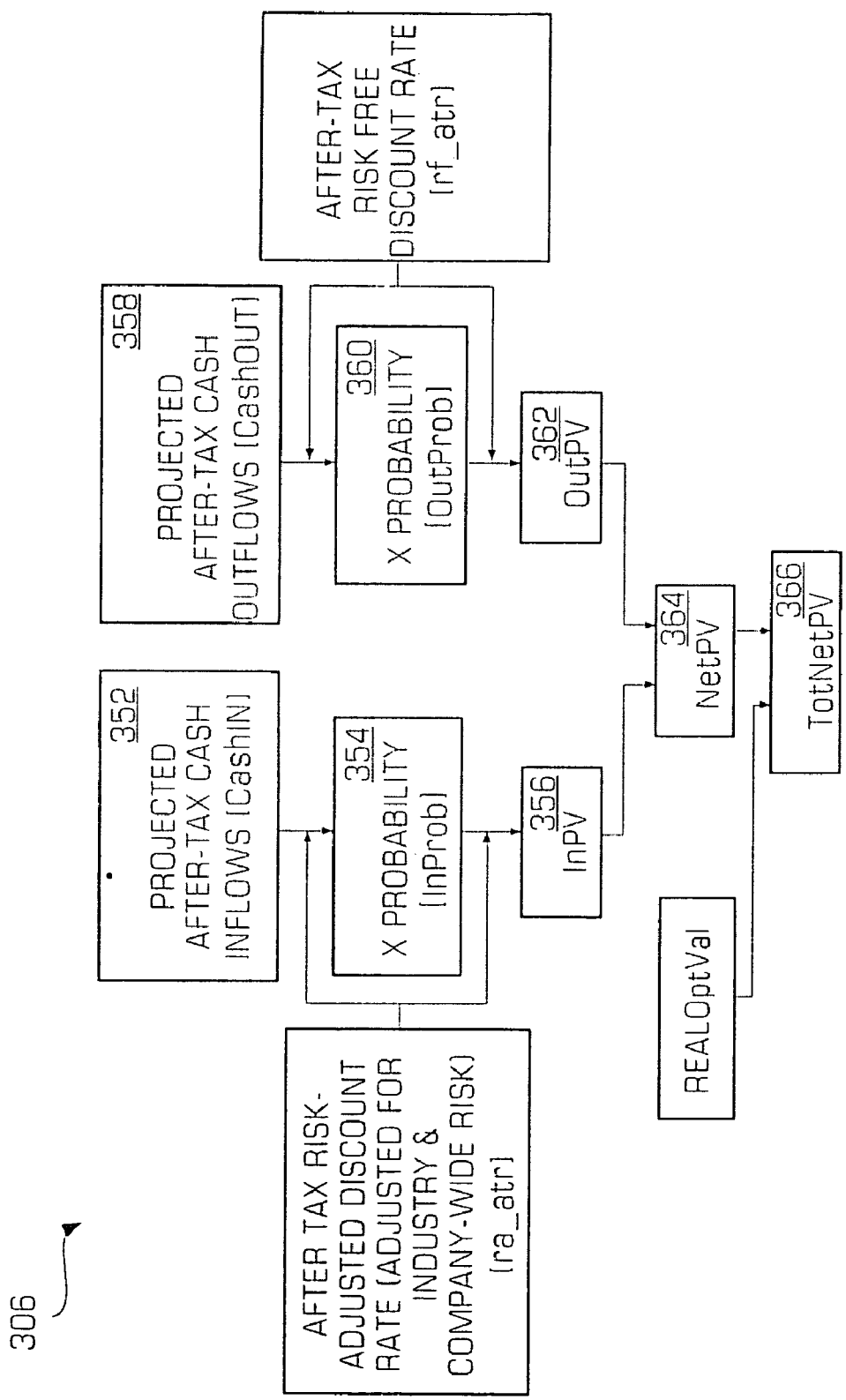
FIG. 4 illustrates a flow diagram for determining net present value of future financial values streams of a business enterprise in accordance with the present invention.

Next, program flow may move to a state 306 where equations for determining present value are applied to the assumptions for the base case scenario (exemplary computations are discussed herein with reference to FIG. 4). Then, from the state 306, program flow moves to a state 308 where outcomes determined by the computations performed in the state 306 are presented. For example, the outcomes may include a monetary amount determined to be the present value of the future value streams of the business enterprise based upon the base case assumptions.

In addition, from the state 304, program flow may move to a state 310. In the state 310, equations for determining present value are applied to the assumptions for the first alternate scenario ("Scenario A"). Then, from the state 310, program flow may move to a state 312 where outcomes determined by the computations performed in the state 306 are presented. For example, the outcomes may include a monetary amount determined to be the present value of the future value streams of the business enterprise based upon the Scenario A assumptions. Further, from the state 304 program flow may move to a state 314. In the state 314, equations for determining present value are applied to the assumptions for the second alternate scenario ("Scenario B"). Then, from the state 310, program flow may move to a state 312 where outcomes determined by the computations performed in the state 306 are presented. For example, the outcomes may include a monetary amount determined to be the present value of the future value streams of the business enterprise based upon the Scenario B assumptions.

FIG. 4 illustrates a flow diagram 306 for determining net present value based upon value creation in accordance with the present invention. For example, the flow diagram of FIG. 4 may be performed in the state 306 of FIG. 3. In a state 352, an amount of a projected cash inflow ("CashIN") for a future financial value stream of the business enterprise may be adjusted by a factor that accounts for the time period between the present and the time that the cash inflow is expected. For example, the factor may be an after-tax, risk-adjusted discount rate ("ra_atr"). The amount of cash inflow, CashIN, may be an assumed variable that influences the future financial value stream for the business enterprise. An event may occur, for example, which triggers this cash inflow. Next, program flow may move to a state 354 where the projected cash inflow determined in the state 352 may be adjusted by a estimated probability that the cash flow will be realized. From the state 354, program flow moves to a state 356.

In the state 356, any additional influences on the future financial value stream for the business (e.g., projected cash inflows) for the same or additional future financial value streams may be adjusted, as in the states 352 and 354 and summed (e.g., aggregated) to determine a total present value for the future financial value streams of the business enterprise. The computations performed in the states 352-356 may expressed as follows (for example, the selected stakeholder category may be "shareholders"):

The present value of projected after-tax cash inflows may be given by:

$$InPV = \sum_{1}^{n} CashIN_i \times \left(\frac{1}{1 + ra\_atr}\right)^i \times InProb$$

where CashIN represents the projected after-tax cash inflow for a specific year; ra_atr is the after-tax risk-adjusted discount rate (adjusted for industry and company-wide risks); InProb is the probability (as assessed by the user or by management of the business enterprise) of the inflows occurring; and InPV is the discounted present value of cash inflows.

The value:

$$\sum_{1}^{n} CashIN_i \times \left(\frac{1}{1 + ra\_atr}\right)^i$$

represents the conventional discounted cash flow (DCF) formula for computing a present value (PV) of $CashIN_1$ in year 1, $CashIN_2$ in year 2, etc.

In a state 358, an amount of a projected cash outflow ("CashOUT") for a future financial value stream may be adjusted by a factor that accounts for the time period between the present and the time that the cash outflow is expected. For example, the factor may be a risk-free, after-tax discount rate ("rf_atr"). Next, program flow may move to a state 360 where the projected cash outflow determined in the state 358 may be adjusted by a estimated probability that the cash outflow will occur. From the state 360, program flow moves to a state 362.

In the state 362, any additional projected cash outflows for the same or any additional future financial value streams may be adjusted, as in the states 358 and 360 and summed to determine a total present value for the business enterprise that is attributable to cash outflows. The computations performed in the states 358-362 may expressed as follows (for example, selected the stakeholder category may be "shareholders"):

The present value of projected after-tax cash outflows is given by:

$$OutPV = \sum_{1}^{n} CashOUT_i \times \left(\frac{1}{1 + \text{rf\_atr}}\right)^i \times OutProb$$

where CashOUT represents the projected after-tax cash outflow for a specific year; rf_atr is the risk-free after-tax discount rate; OutProb is the probability (as assessed by the user or by management of the business enterprise) of the outflows occurring; and OutPV is the discounted present value of cash outflows.

Next program flow moves to a state 364 where the total present value of projected cash outflows may be subtracted from the total present value of projected cash inflows to determine a net present value for business enterprise.

The net present value (NetPV) computed in the state 364 may be given by:

NetPV=InPV−OutPV where NetPV is the net of the present values of cash inflows and outflows.

Then, program flow moves from the state 364 to a state 366 where the effect of real options value (if any) included in any of the enterprise's strategies may be incorporated in the computation. Thus, the present value computed in the state 366 may be given by:

TotNetPV=NetPV+RealOptVal where RealOptVal is the "real options value" of the ability to defer certain expenses until future events suggest that further investment is warranted (similar to taking an option on a stock before advancing the full investment price of the stock). The real options value may be determined conventionally by reference to the Black-Scholes equation.

It will be apparent that the above formulas are exemplary and are taken from the perspective of a shareholder. Other formulas may be used to calculate present values for any of the other stakeholder groups. For example, from the perspective of a stakeholder that is a joint venture partner, the events, their associated probabilities of occurrence and their associated financial benefits will result in different financial outcomes than those experienced by a shareholder.

Figure 5:
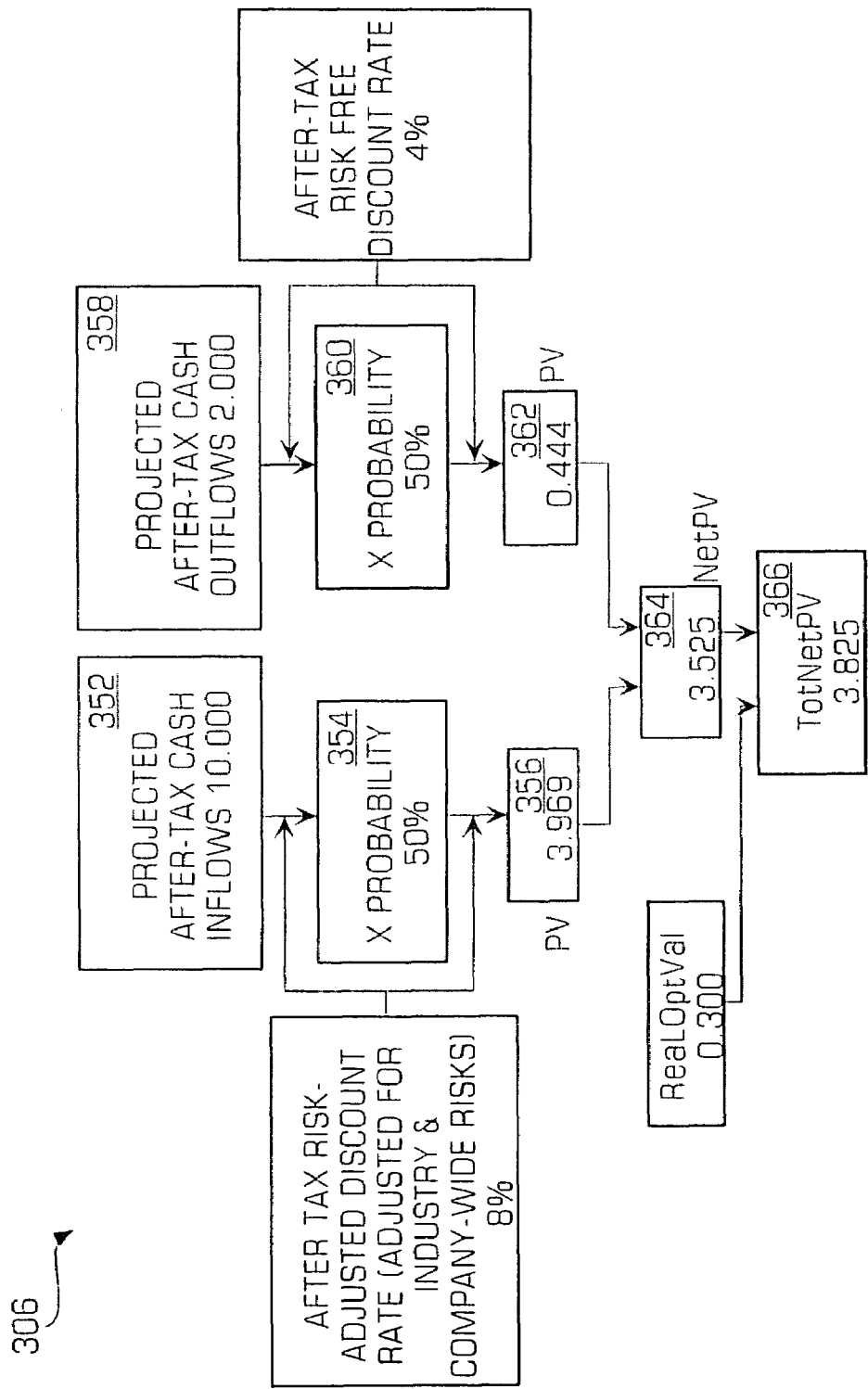
FIG. 5 illustrates the flow diagram of FIG. 4 including exemplary projected cash flows and related probabilities.

FIG. 5 illustrates the flow diagram 306 of FIG. 4 including exemplary projected cash flows and related probabilities. The example considers a case where a pharmaceutical company anticipates the sale of rights to manufacture a particular drug 3 years in the future for $10.000 million. Therefore, in the state 352, CashIN is equal to $10.000 million. In addition, the after-tax risk-adjusted discount rate, which is adjusted for industry-wide and company-wide risks, is assumed to be 8%. Therefore, ra_atr used for this example for cash inflows is equal to 0.08. Since with the drug project is just through Phase III Clinical Trials, the probability that the drug will be approved by the Food and Drug Administration (FDA) and final commercialization is estimated at 50%. Therefore, InProb for this example is 50%.

In that case, the above formula:

$$InPV = \sum_{1}^{n} CashIN_i \times \left(\frac{1}{1 + \text{ra\_atr}}\right)^i \times InProb$$

simplifies to:

$$InPV = 10.000 \times \left(\frac{1}{1.08}\right)^3 \times 50\% = 3.969$$

Also in the example, the expenses associated with commercialization of the drug are estimated to be $2.000 million. The after-tax risk-free discount rate, rf_atr, used for cash outflows is assumed to be 4%. In addition, the same probability of 50% is associated with the outflow.

Accordingly, the formula:

$$OutPV = \sum_{1}^{n} CashOUT_i \times \left(\frac{1}{1 + \text{rf\_atr}}\right)^i \times OutProb$$

simplifies to:

$$OutPV = 2.000 \times \left(\frac{1}{1.04}\right)^3 \times 50\% = 0.444$$

and so

NetPV=InPV−OutPV=3.969−0.444=3.525

Depending upon the circumstances, the rates for ra_atr and rf_atr may be larger or smaller. In addition, under certain circumstances it may be appropriate to use a surplus cash after-tax short-term investment-rate (rather than an after-tax risk-free rate) for cash outflows.

Adding a real options value of $0.300 million (calculation not shown in this example but may be performed in accordance with conventional techniques) yields:

TotNetPV=NetPV+RealOptVal=3,525+0.300=3,825

Figure 6:
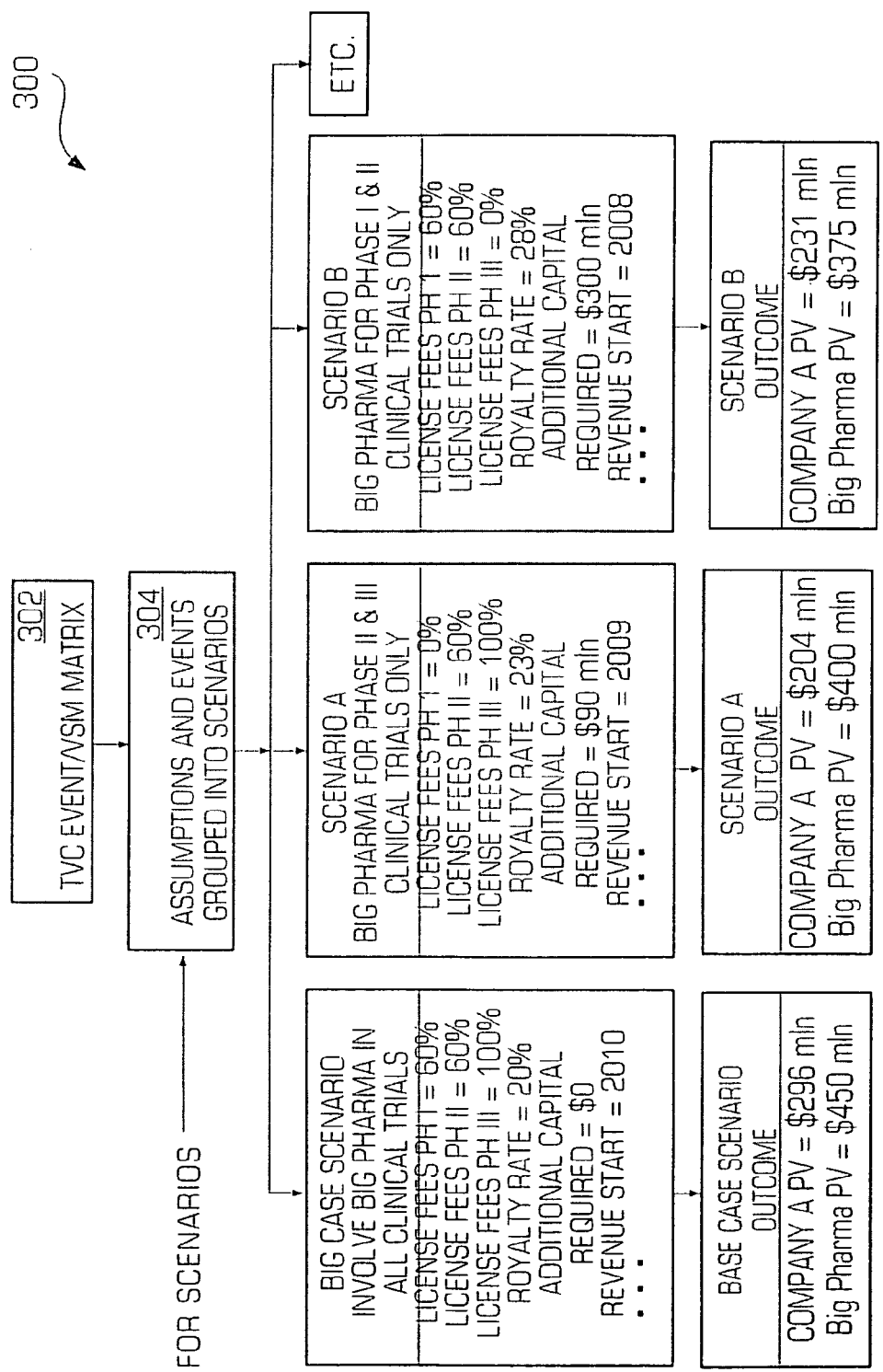
FIG. 6 illustrates the flow diagram of FIG. 3 including exemplary values for various assumptions.

As a more complex example, FIG. 6 illustrates the flow diagram of FIG. 3 including exemplary values for various assumptions (e.g., assumed variables). In the example, a fictional pharmaceutical company, referred to herein as "Company A," is involving a larger company as a partner, referred to herein as "Big Pharma," in all its clinical trials. As a base case scenario, license fees are assumed to be 60% for Phase I trials, 60% for Phase II trials, and 100% for Phase III Trials and ongoing royalties on subsequent commercialized sales are assumed to be 20%. With this amount of projected license fees, no further capital is expected to be required since the initial capital was raised with the base case scenario in mind. Commercialization and related revenues is expected to start in the year 2010. To determine the present value of the future financial value streams of the business enterprise taking into account this base case scenario, computations may be performed in accordance with the flow diagram illustrated in FIG. 4. However, the details of the computations are not shown in FIG. 6. The outcome for the base case scenario, for example, may be a present value (PV) of $296 million.

In addition, two alternative scenarios may be presented. In a first alternate scenario ("Scenario A"), the company conducts the Phase I trials on its own and only involves Big Pharma partner in Phase II and III trials. Because of the lesser financial commitment of Big Pharma, it would normally pay a higher royalty rate on ultimate sales. However, this scenario may require Company A to raise additional capital of $90 million to make up for the missing Phase I license fees. As an offsetting factor, commercialization and related revenues are expected to start in the year 2009. This is because a Big Pharma has its own ongoing manufacturing operations to consider with research and development tending to be a minor sideline. Consequently, Company A itself is expected to act more quickly than Big Pharma. Therefore, commercialization in Scenario A is expected to occur more quickly in comparison to the base case scenario.

Therefore, if Company A conducts the Phase I trials on its own, they will be completed somewhat sooner, thus advancing the final commercialization date. In computing the outcome, the discounted cash flow calculations utilized to determine the present value reflect the lower license fees (unfavorable), the higher royalty rates (favorable), and the earlier commercialization date (favorable). The net effect in this assumed example, is a computed present value (PV) of $204 million. Clearly, at present, Company A achieves a better outcome with the base case scenario. Accordingly, the better choice is to direct the company along the path indicated by the base case scenario.

Various factors, however, may change over time. If, as a result of revised assumptions (revenues, costs, timing, etc.) the recomputed Scenario A ever turns out to be more favorable than the recomputed base case scenario, then Company A will likely change its strategic decisions and opt for Scenario A.

In a second alternate scenario ("Scenario B"), Company A conducts the very long and expensive Phase III trials on its own and involves Big Pharma as a partner in only the Phase I and II trials. Compensating factors expected to result from this more significant change are an increase of the royalty rate to 28% and acceleration of the commencement of commercialization to the year 2008. However, Company A may have to raise an additional $300 million capital to finance the Phase III trials. When the present value is computed with all of these changes factored in, present value under Scenario B may be found to be $231 million. Again, the base case scenario at remains the most favorable. Updated assumptions may continue to be collected in the database 104 (FIG. 1) for each of these scenarios, as various events transpire so that, at any time, management can decide to change strategic direction should an alternative scenario prove optimal at some point in the future.

FIG. 6 also shows the comparative values for the Big Pharma stakeholder. While this is not shown in the example, the system may generate the present value of the base case and each alternative scenario for multiple stakeholders. The difference in the computations is that from the perspective of the Big Pharma company there will be different assumptions made about cash inflows and outflows and their associated probabilities.

Some scenarios may eventually cease to be viable alternatives. For example, assuming Company A has contracted with Big Pharma to participate in the Phase I Clinical Trials, Scenario A is no longer a continuing option. As such, Scenario A may be dropped from the database 104 (FIG. 1). Depending on how the contract with the Big Pharma has been drawn up, however, Scenario B may continue to be a viable option that may be revisited at a later time (e.g., as the time for the Phase III Clinical Trials draws closer).

Figure 7:
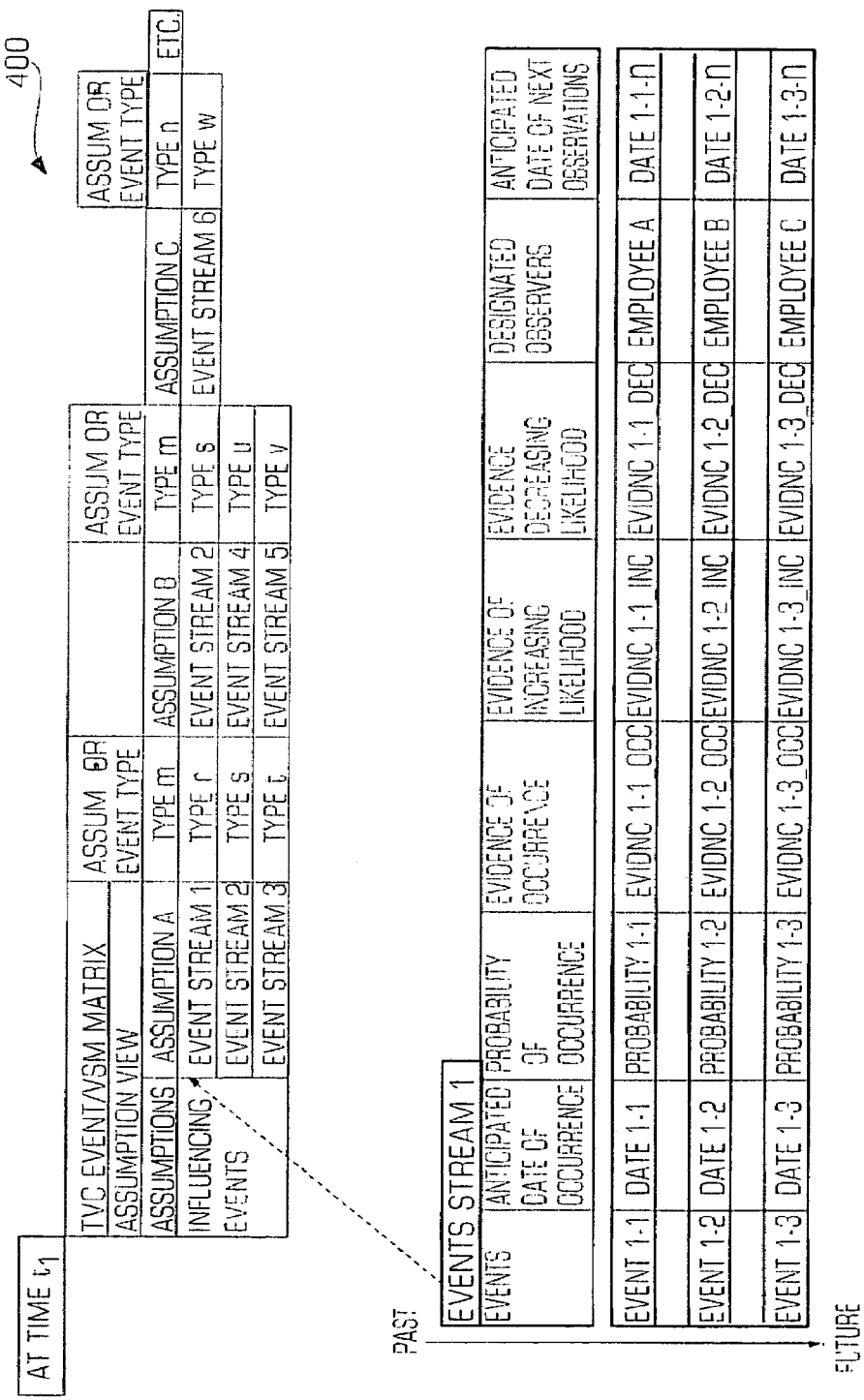
FIG. 7 illustrates an event matrix data structure for storing assumptions and their related events in accordance with the present invention.

FIG. 7 illustrates an event matrix data structure 400 for storing assumptions (e.g., assumed variables) and their related events in accordance with the present invention. As stated previously, the event matrix 400 stored in the database 104 (FIG. 1) is a relational database in which assumptions, events, and their related probabilities are collected. The system 100 is event-driven. That is, each assumption is based on various projected events that are expected to influence the related assumption. If over a period of time, the projected future events all come to pass exactly as anticipated, then the assumptions in the matrix 400 remain unchanged. However, if a projected event does not occur, or if it occurs in a different way or to a different extent than originally projected, or if a previously unanticipated event occurs, then the related assumption may be modified in the matrix 400.

Figure 9:
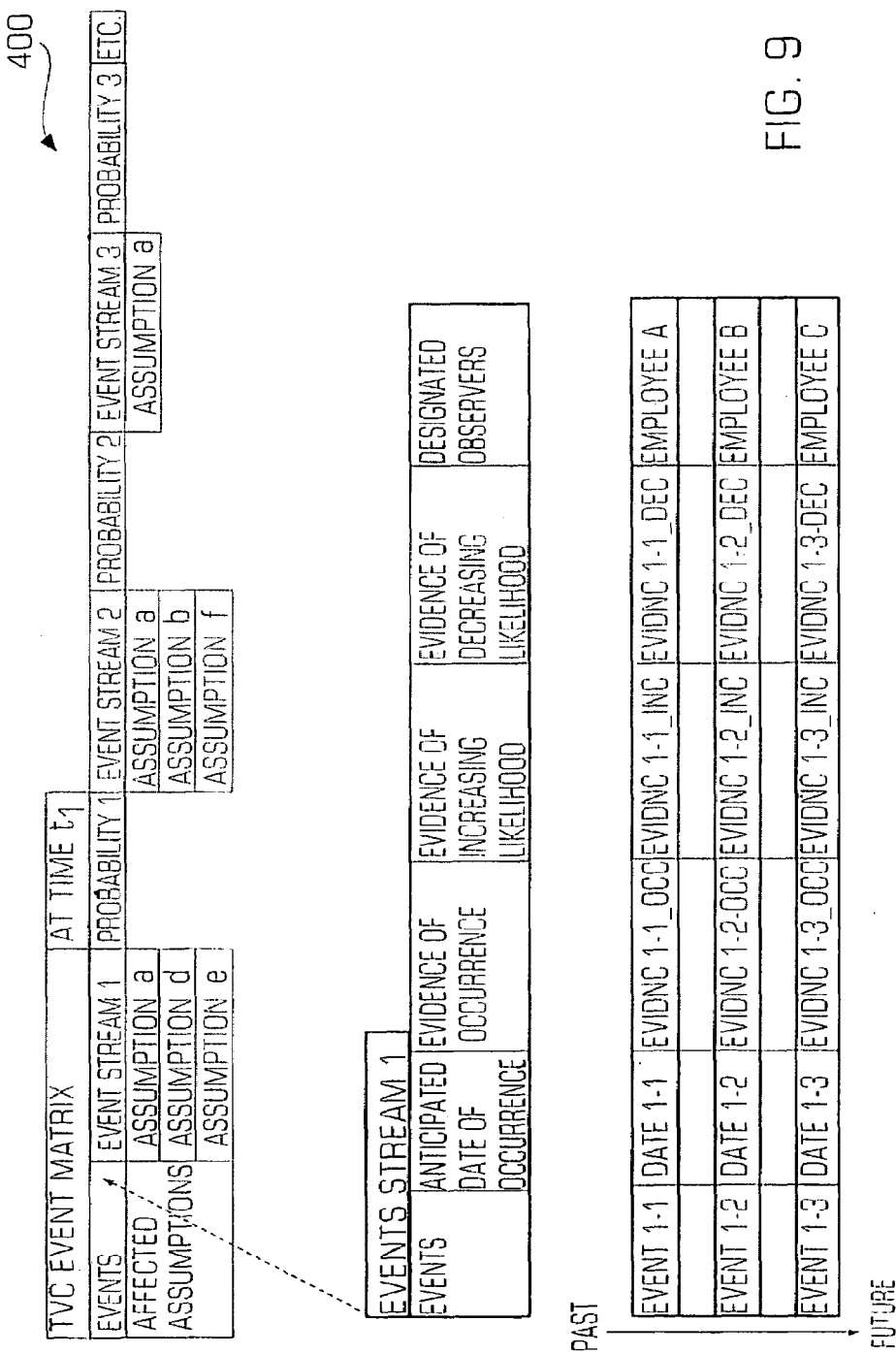
FIG. 9 illustrates an event matrix data structure for storing events and their related assumptions in accordance with the present invention.

As shown in FIG. 7, the matrix 400 contains the assumptions that are utilized as a basis for computing the present value of the future value streams of the business enterprise, the related projected events (e.g., a related event stream) upon which the assumptions depend, and management's assessment of the probability of those events occurring. The assumption-event-probability relationships within the matrix 400 can be displayed in either of two ways. In an "assumption view," the system 100 presents the assumptions and, for each assumption, shows the influencing events. The assumption view is shown in FIG. 7. In an "event view," the system 100 focuses first on events and, then, for each event shows the "affected assumptions." The event view of the event matrix 400 is shown in FIG. 9.

FIG. 7 (assumption view) shows that "Assumption a" is influenced by Event Streams 1, 2, and 3, while "Assumption b" is influenced by Event Streams 2, 4, and 5. Note that more than one assumption may be influenced by the same event stream (e.g., both Assumption a and Assumption b may be influenced by Event Stream 2).

Each event stream can be further decomposed into specific component events in that stream. Thus, Event Stream 1 may include projected Event 1-1, Event 1-2 and Event 1-3. For each event, the matrix 400 may include additional information. This may include, for example, an anticipated date of occurrence, a probability of occurrence (as assessed by management), what will constitute evidence of occurrence, if and when the event occurs, and, prior to the event actually occurring, evidence of increasing likelihood that it will occur. In addition, evidence of decreasing likelihood that it will ever occur may be included. Also, an observer may be designated who will be charged with the responsibility of assessing these early warnings (whether evidence of increasing likelihood or evidence of decreasing likelihood) and for observing actual evidence of occurrence if the event, in fact, occurs. These observer-reported observations regarding the event stream may be continuously fed into the matrix 400, which in turn will affect the assumptions and therefore the projected outcomes based upon computation of the present value. Because the occurrence of an event triggers a re-computation of the outcomes, the system 100 (FIG. 1) may be said to be event-driven.

Figure 8:
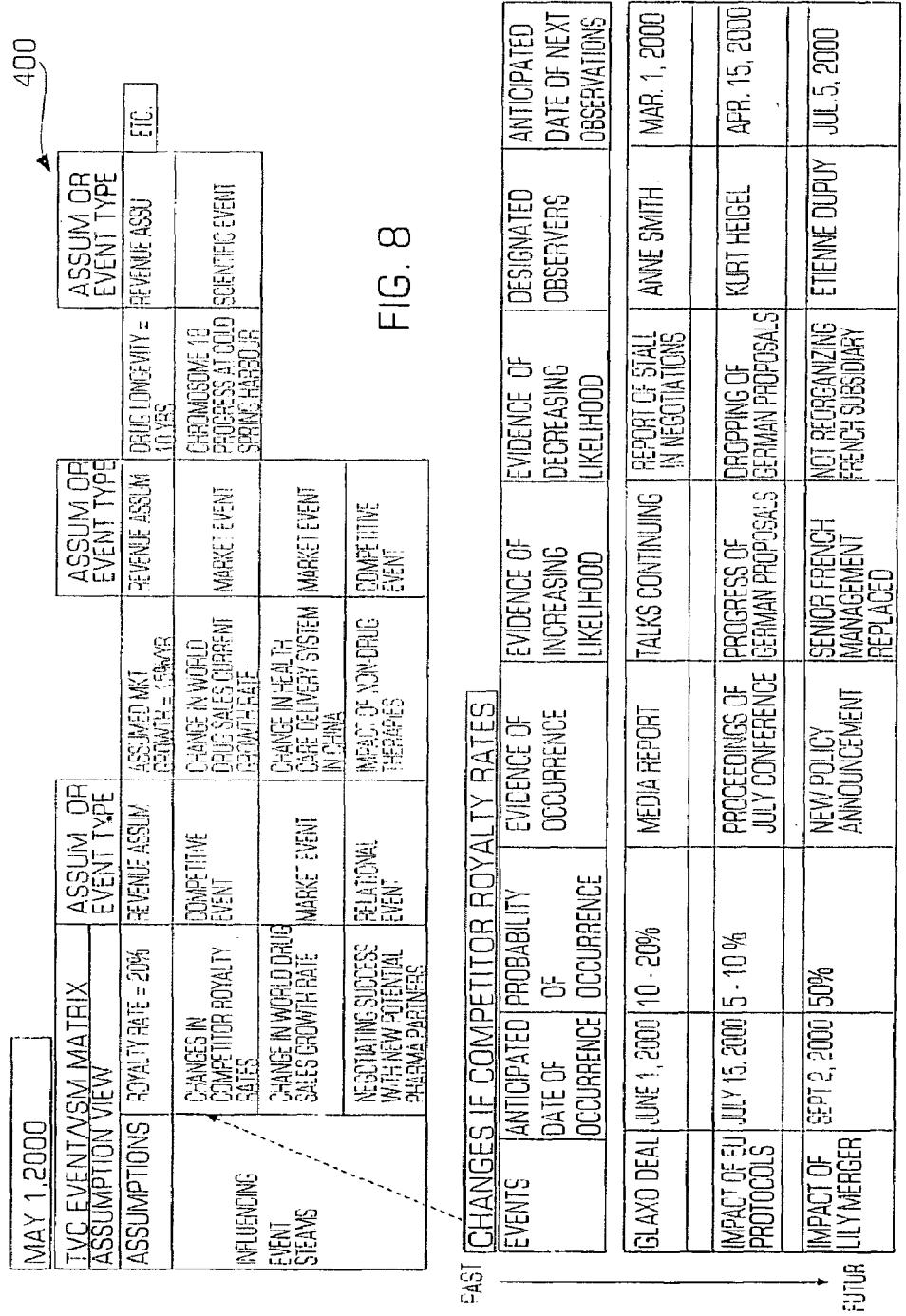
FIG. 8 illustrates the event matrix data structure of FIG. 5 including exemplary assumptions and related events.

FIG. 8 illustrates the event matrix data structure 400 of FIG. 7 including exemplary assumptions and related events. In this example of a small portion of the event matrix 400, i.e., three assumptions and their related events, are considered. One is the assumption that Company A will earn a royalty rate of 20%. This assumption, in turn, will be influenced by three identified event streams: changes in competitor royalty rates, which would influence Company A's negotiations with potential Big Pharma partners; changes in the growth rate of world drug sales (e.g., a markedly higher rate might put downward pressure on royalty percentages); and Company A's negotiating success with other new potential partners (e.g., success in other negotiations would make the assumed royalty rate more likely).

Another assumption in the example is the assumed market growth rate for bio-tech drugs of 15% a year. This is a relatively high growth rate but reflects the explosion of opportunities that are anticipated to follow the impending completion of the Human Genome Project (the complete mapping of the human genome). This assumed future growth rate will be influenced by three identified event streams: changes in the current growth rate of world drug sales (e.g., a downturn in the current rate would suggest the possibility of a lower than previously forecast future growth rate); a change in the health care delivery system in China (e.g., certain developments would open up that country for western bio-tech drugs, which would double or triple the potential market size); and the impact of non-drug therapies (e.g., if they increase in popularity, there may be a downturn in drug sales).

A third assumption in this small portion of the matrix 400 is the longevity assumption that a new Company A drug will last for 10 years after commercialization before it becomes obsolete as a result of a new, leap-frogging scientific discovery.

Each of the event streams can be further analyzed into specific component events in that stream. In this example, the event stream "changes in competitor royalty rates" contains at least three events. The rumored deal with a competitor (referred herein fictionally as "Company B") would raise the bar and generally lead to higher royalties. Such a deal might occur by Jun. 1, 2000 but Company A management attributes a probability to this happening of only 10% to 20%.

If it ever occurs, it will be immediately publicized by the scientific media. In the meantime, whether talks are continuing (increasing likelihood) or become stalled (decreasing likelihood) is something that designated observer "Anne Smith" is charged with the responsibility of monitoring. It is expected that the next relevant observation she can likely make will be around Mar. 1, 2000, although unexpected changes in timetable are possible. Another anticipated influencing event is the impact of new EU protocols that could have the effect of lowering royalty rates generally. Company A management estimates that there is only a 5% to 10% probability of these protocols ultimately being agreed upon. If they are adopted, it would most likely be on Jul. 15, 2000 following the July EU Conference. Evidence of increasing likelihood would be progress in the consideration of the recent German proposals while decreasing likelihood would be suggested if the German proposals get dropped. Designated observer, "Kurt Heigel" will be monitoring this situation and will likely have an updated observation to make by mid April.

Finally, the impact of a recent merger of another competitor (referred to herein as "Company C") could have a minor reducing influence on royalties and Company A management estimates the effect is 50% probable. The effect is anticipated to be more likely if it turns out that the French senior management team of Company C is replaced and less likely if it turns out that there will be no reorganizing of the French subsidiary. A designated observer, "Étienne Dupuy" may be monitoring this situation and will likely have an updated observation to make by early July.

The event matrix 400 also characterizes each assumption by type. Having such an organized typology of assumptions helps to assure that all relevant assumptions have been identified and stated explicitly. Assumptions can be classified, for example, as: revenue assumptions; expense assumptions; discount rate assumptions; and timing assumptions.

Another aspect of the system 100 (FIG. 1) may be an organized typology of events. For example, events may be characterized as follows: (a) enterprise events, which are internal to or involving the enterprise, and which include: relational events (e.g., negotiations with a potential strategic partner); operational events (e.g., the completion of Phase II clinical trials); contractual events (e.g., the signing of a royalty agreement); transactional events (e.g., the receipt of license fees); observational events (e.g., observations made during marketing research); and decisional events (e.g., the decision to drop Drug A and develop Drug B); (b) external events, which are wholly outside the enterprise but ultimately influencing it, and which include: market events, which affect an entire industry; competitive events (e.g., the threat of a newly successful competitor); and supply events, which affect the availability of needed resources; (c) event implications, which include: new opportunities, which are clearly indicated; new confirmatory evidence that the future is unfolding as previously assumed; new contradictory evidence that the future may not be unfolding as assumed; and new threats, which are clearly identified.

FIG. 9 illustrates an event matrix data structure for storing events and their related assumptions in accordance with the present invention. As mentioned, in the event view, the system 100 (FIG. 1) displays events and, then, for each event shows the affected assumptions. In this figure, the event streams shown are Event Stream 1, Event Stream 2, and Event Stream 3. The first affects Assumptions a, d, and e; the second affects Assumptions a, b, and f; the third affects only Assumption a.

The system 100 (FIG. 1) may determine four types of outcomes for each stakeholder: financial value creation, which includes the Present Value of future value creation streams; non-financial value creation, which includes appropriate metrics to reflect value streams that cannot be conveniently denominated in cash and cash equivalents; financial value destruction, which includes the Present Value of future value destruction streams; and non-financial value destruction, which includes appropriate metrics to reflect value destruction potential that cannot be conveniently denominated in cash and cash equivalents.

In any venture, there is always the potential for the loss of one's initial investment if the project fails. In such a case, the present value would be zero. However, it is not always that case that one's potential loss is limited to one's initial investment. Accordingly, the financial value destruction calculation is relevant in situations where the potential loss is greater than the investment at risk. FIG. 10 illustrates a flow diagram 500 for determining the effect on present value based on financial value destruction and its related probability.

The steps for calculating financial value destruction parallel those described herein for calculating financial value creation. In a state 502, a projected after-tax cash value is ascertained for a financial value destruction instance. Then, program flow moves to a state 504 where the cash value is adjusted by an ascertained probability that the value destruction will occur. For example, the cash value may be multiplied by the probability. From the state 504 program flow moves to a state 506. In a state 506, a result of the adjustment performed in the state 504 may be presented.

FIG. 11 illustrates the flow diagram of FIG. 10 including an exemplary value destruction and related probability. In the value destruction example, Company A has become aware that under one scenario under consideration, if it decides to terminate a certain project, it risks losing one of its key lead scientists, which may in turn result in a loss of key contacts that are essential to the success of a second major project valued at $2 million. Thus, the cash value ascertained in the state 502 is $2 million. The probability attached to this combination of circumstances is 10%. Thus, in the state 504, when discounted at 8% (an after-tax non-risk adjusted discount rate, "ua_atr"), and multiplied by the 10% probability factor, the equation $$ValDestrucPV = \sum_{1}^{n} ValDestruc_i \times \left(\frac{1}{1+\text{ua\_atr}}\right)^i \times DestrucProb$$

yields a present value of $79,000. This value may be presented as an outcome in the state 506.

Figure 12:
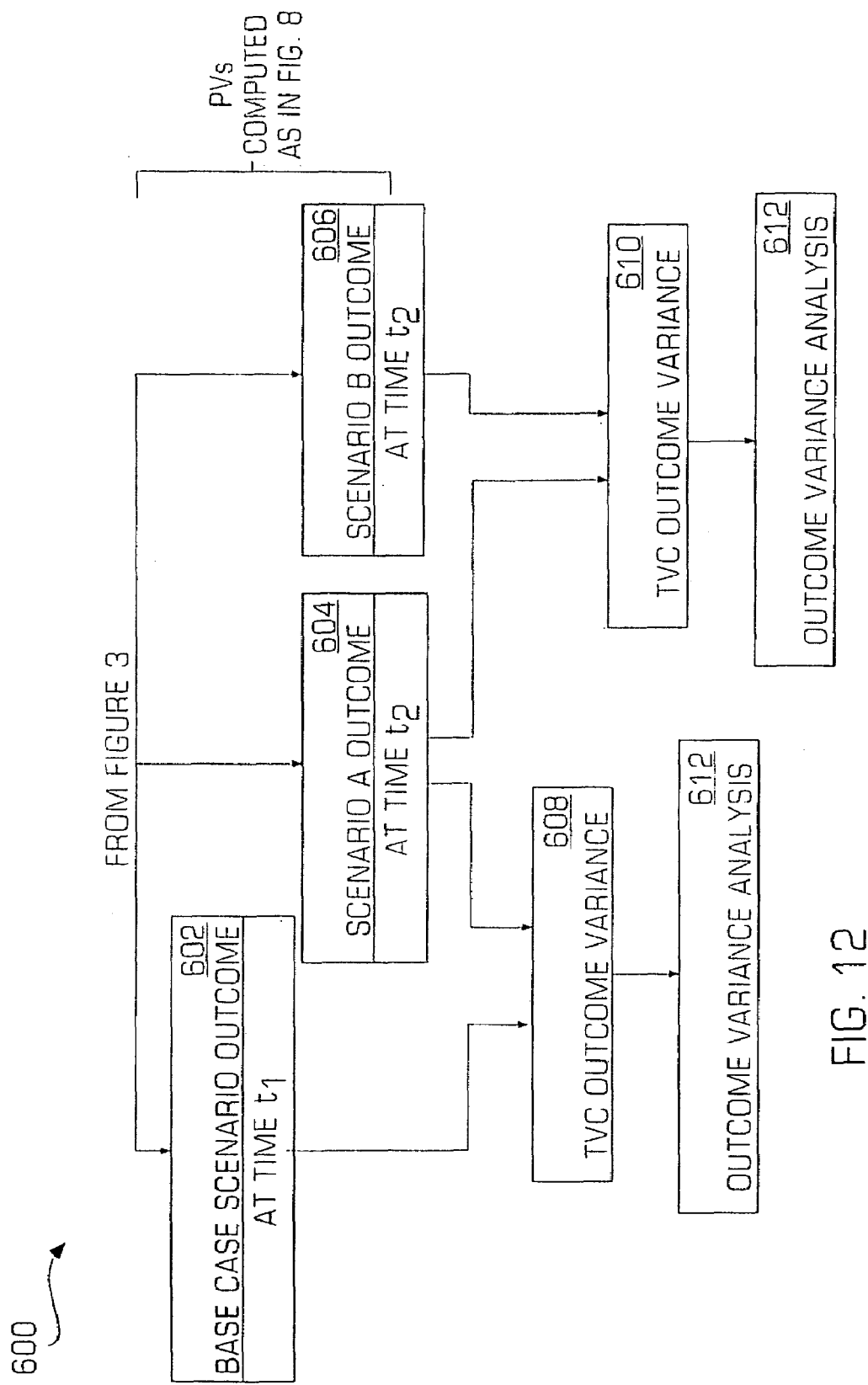
FIG. 12 illustrates a flow diagram for determining an outcome variance for different future scenarios in accordance with the present invention.

FIG. 12 illustrates a flow diagram for determining an outcome variance for different future scenarios in accordance with the present invention. In states 602, 604, and 606 present values for each of the base case scenario, and one or more additional scenarios (e.g., Scenarios A and B) may be determined, as explained in reference to FIGS. 3-4. For tracking performance over time, the outcomes for the base case scenario may be determined with respect to a first point in time, while the outcomes for the alternate scenarios may be determined with respect to a later 115 point in time.

Then, the various outcomes of these scenarios may be compared in states 608 and 610. This may be accomplished, for example, by determining an outcome variance using the following equation:

where $t_2 > t_1$:

$$\text{OutcomeVar}_{A>bc} = \text{TotNetPV}_A - \text{TotNetPV}_{bc} \times (1 + ra\_atr)^{(t2-t1)}$$

This equation is equivalent to taking the present value (PV) at the beginning of the period in question, and adding a cost of capital return (COCr), and comparing the result to the calculated present value (PV) at the end of the period.

If the outcome variance is zero, then the organization has earned exactly the returns expected during the period. Normally, however, there will be a difference between the actual present value (PV) and the expected present value (PV) after adding the cost of capital return.

A next step that may be performed by the system 100 (FIG. 1) in the states 612 and 614 is an analysis of the changes in events and related assumptions that, in combination, account for the Outcome Variance. This analysis may be important to providing management of the business enterprise accountability for the selection of events and assumptions in the event matrix 400, 450 (FIGS. 7, 9).

A similar type of analysis can be performed to compare one or more scenarios at a particular point in time.

where $t_2 = t_1$:

$$\text{OutcomeComp}_{B>A} = \text{TotNetPV}_B - \text{TotNetPV}_A$$

In the case, the equation is used to compare the outcomes of the scenarios under comparison. A similar analysis of the reasons for the difference in outcomes can be performed to identify the critical differences in events and assumptions between the scenarios and may be important to strategic planning for the enterprise.

FIG. 13 illustrates an exemplary determination of outcome variance. In FIG. 13, using the example for Company A, the calculation of an outcome variance of $53.929 million is shown based on applying a cost of capital return (COCr) to the present value (PV) at the beginning of the period (i.e. an opening present value), and comparing the result to the calculated PV for the current period.

This is followed by an analysis of the changes in events and assumptions that account for the calculated difference. In this illustration, the difference is accounted for by 8 factors:

Five factors caused PV to be higher than previously calculated: (1) expected increase in future sales for BioInformatics Tool #4; (2) expected increase in biotech sales world wide (which will also results in an increase in Company A sales); (3) a revision upward of the expected sales for Biotech Drug #26; (4) an upward increase in general sales growth based on the world sales increases the previous; and (5) slightly higher investment income performance.

Three factors caused PV to be lower than previously calculated: (1) slight overrun in R&D spending; (2) an expectation that this overrun would continue into the future; and (3) a higher donation to the World Health Organization (because of the positive outcome variance).

Figure 14:
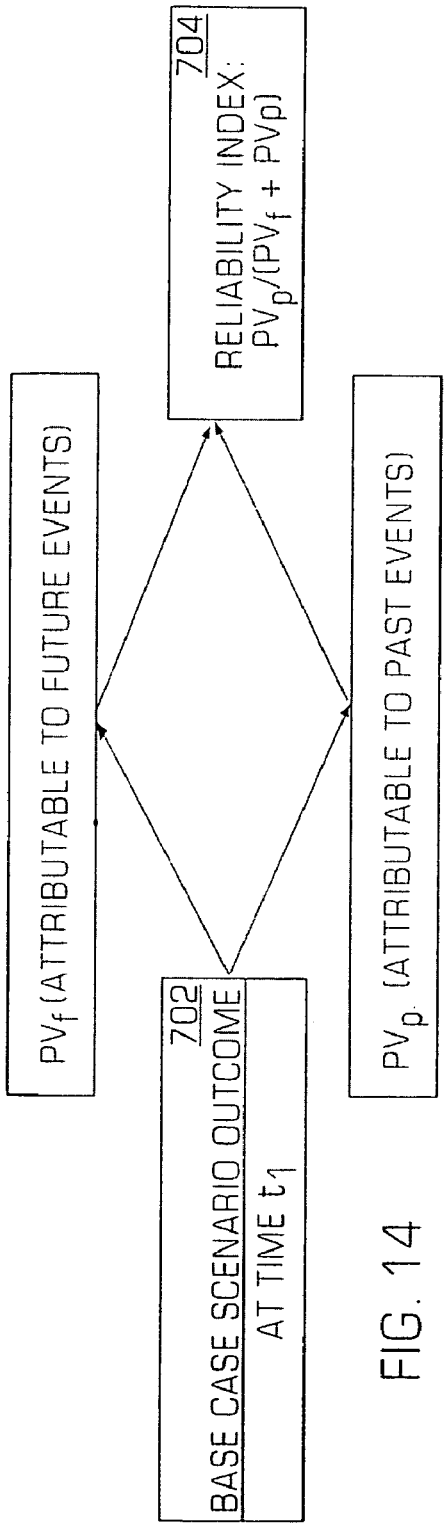
FIG. 14 illustrates a flow diagram for determining a reliability index for a present value determination in accordance with the present invention.

The fact that present values (PV's) are determined based on projected future events and related assumptions in accordance with the present invention introduces a greater degree of subjectivity than is the case with traditional accounting techniques, in which most values can be traced back to a third party transaction. Thus, measurement of this subjectivity may be performed by the system 100 (FIG. 1). FIG. 14 illustrates the calculation of a "reliability index."

In a state 702, the present value determined for a base case scenario is segregated into those portions that are attributable to projected future events ($PV_f$) and those portions that are attributable to past events ($PV_p$). Then, in a state 704, the reliability index is determined taking into account the relative portions of the total PV contributed by projected future events and past events.

Accordingly, the reliability index may be determined from the following formula:

$$\text{reliability index} = PV_p / (PV_f + PV_p)$$

where $PV_p$ is the PV attributable to past events (and related assumptions) and $PV_f$ is the PV attributable to future events (and related assumptions). The higher the result (expressed as a fraction of 1), the greater the reliability of the estimate. It will be apparent that $PV_f$ and $PV_p$ may be combined in another way to determine a reliability index.

The reliability index provides a comparative indication of the degree to which calculated outcomes (e.g., present values) are attributable to assumptions based on events that have already occurred, versus assumptions based on future events. For example, if future sales projections are based on achieving a certain market share, and that market share has already been achieved, one would be inclined to place more reliance on those projections than if all required market gains were still in the future.

This calculation may be facilitated by flagging all events in the event matrix 400 (FIGS. 7 and 9) stored in the database 104 (FIG. 1) to indicate whether they have already occurred or are scheduled to occur in the future, and the fact that all assumptions in the system 100 are linked to events.

Figure 15:
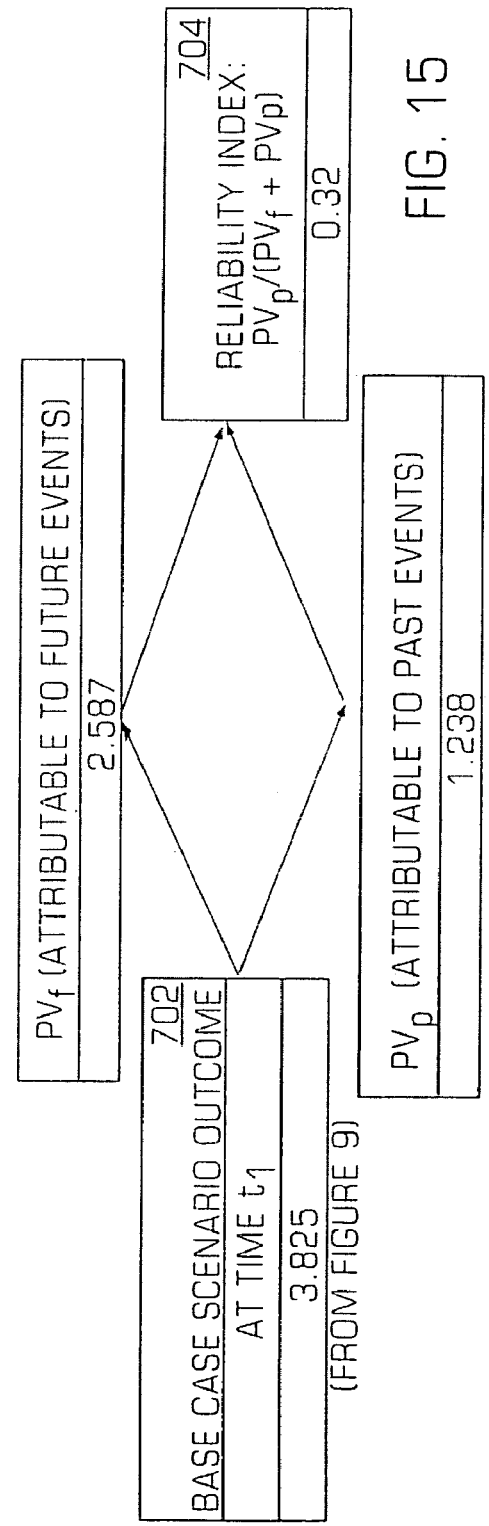
FIG. 15 illustrates the flow diagram of FIG. 14 including an exemplary determination of the reliability index.

FIG. 15 illustrates the flow diagram of FIG. 14 including an exemplary determination of the reliability index. Building on FIG. 5, FIG. 15 shows that, for the particular value streams in question, $2.587 million of the calculated outcome can be attributed to events and related assumptions that are still in the future, while $1.238 million is attributed to past events. This yields a reliability index of 0.32.

The absolute value of the reliability index may be most helpful on a comparative basis where a reliability index for two or more different scenarios are compared. Management of a business enterprise may take into account such a comparison when making decisions about alternative scenarios.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A computer-implemented method of processing data relating to the performance of a business enterprise in creating value, comprising:

developing a data structure, by use of a computer system, including one or more assumed variables that have an influence on a future financial value stream of the business enterprise and at least one future or past event linked to each assumed variable that influences the corresponding assumed variable;

determining, by use of the computer system, a first present value of the future financial value stream of the business enterprise with respect to a first point in time by aggregating the influences on the future financial value stream attributable to the assumed variable and adjusting the future financial value stream for a time value of money;

receiving as input into the computer system data from a user indicating the occurrence or non-occurrence of one or more of the future events;

determining, by use of the computer system and in response to the occurrence or non-occurrence of one or more of the future events, whether one or more of the assumed variables have changed and whether the influenced future financial value stream has changed;

determining, by use of the computer system, a second present value of the future financial value stream with respect to a second point in time taking into account the one or more assumed variables that changed in response to the occurrence or non-occurrence of the one or more of the future events;

determining a variance between the first present value and the second present value taking into account the time value of money between the first and second points in time; and attributing the variance between the first present value and the second Present value to the occurrence or non-occurrence of events between the first and second points in time.

2. The method according to claim 1, wherein determining the first present value further comprises adjusting the future financial value stream by an assessed probability that the influences on the future financial value stream will be realized, and determining the second present value further comprises adjusting the future financial value stream by an assessed probability that the influences on the future financial value stream will be realized taking into account an assessed probability that changed in response to the occurrence or non-occurrence of the one or more of the future events.

3. The method according to claim 1, wherein the future financial value stream is associated with activities of the business enterprise necessary to give rise to the events associated with the future financial value stream.

4. The method according to claim 1, further comprising:
determining a present value of the future financial value stream by aggregating influences on the future financial value stream attributable to past events; and
determining a reliability index that is indicative of relative magnitudes of the present value of the future financial value stream attributable to past events and the present value of the future financial value stream attributable to future events.

5. The method according to claim 1, wherein the events and assumed variables collectively form a base case scenario for the business enterprise, and the first present value of the future financial value stream is based upon the base case scenario, the method further comprising:
changing one or more of the assumed variables, to form an alternate scenario including the changed assumed variables;
determining the present value of the future financial value stream based upon the alternate scenario; and
comparing the present value of the future financial value stream based upon the alternate scenario to the first present value of the future financial value stream based upon the base case scenario.

6. The method according to claim 1, further comprising selecting a stakeholder perspective from among a plurality of stakeholder perspectives for determining the first and second present values of the future financial value stream.

7. The method according to claim 1, further comprising selecting two or more stakeholder perspectives from among a plurality of stakeholder perspectives for determining the first and second present values of the future financial value stream.

8. The method according to claim 1, wherein the first present value is determined with respect to a first date and the second present value is determined with respect to a second date, and the method further comprises:
determining a variance between the first present value and the second present value taking into account the time value of money between the first and second dates; and
attributing the variance between the first present value and the second present value to events that occurred between the first and second dates.

9. A computer-implemented method of processing data relating to the performance of a business enterprise in creating value, comprising:
developing a data structure, by use of a computer system, including a plurality of future financial value streams, each future financial value stream having one or more assumed variables that have an influence on a future financial value stream of the business enterprise and at least one future or past event linked to each assumed variable that influences the corresponding assumed variable;
determining, by use of the computer system, a present value of each future financial value stream of the business enterprise with respect to a first point in time by aggregating the influences on the future financial value stream attributable to the assumed variables of the future financial value streams and adjusting the future financial value streams for a time value of money;
aggregating the present value of each future financial value stream to form a first aggregate present financial value of the plurality of future financial value streams;
receiving as input into the computer system data from a user indicating the occurrence or non-occurrence of one or more of the future events;
determining, by use of the computer system and in response to the occurrence or non-occurrence of one or more of the future events for one or more of the future financial value streams, whether one or more of the assumed variables have changed and whether the influenced future financial value stream has changed;

forming a second aggregate present value of the plurality of future financial value streams taking into account the one or more assumed variables that changed in response to the occurrence or non-occurrence of the one or more of the future events;

determining a variance between the first present value and the second present value taking into account the time value of money between the first and second points in time; and attributing the variance between the first present value and the second Present value to the occurrence or non-occurrence of events between the first and second points in time.

10. The method according to claim 9, wherein determining the present value of each future financial value stream further comprises adjusting the future financial value stream by an assessed probability that the influences on the future financial value stream will be realized.

11. The method according to claim 9, wherein each of the plurality of future financial value streams is associated with activities of the business enterprise necessary to give rise to the events associated with the corresponding future financial value stream.

12. The method according to claim 9, further comprising:
determining a present value of each of the plurality of future financial value streams by aggregating influences on each of the future financial value streams attributable to past transactions; and determining a reliability index that is indicative of relative magnitudes of the second aggregate present value of the plurality of future financial value streams and an aggregation of present values of the plurality of future financial value streams attributable to past transactions.

13. The method according to claim 9, wherein the events and assumed variables for each of the plurality of future financial value streams collectively form a base case scenario for the business enterprise, and the first aggregate present value of the plurality of future financial value streams is based upon the base case scenario, the method further comprising:
changing one or more of the assumed variables, to form an alternate scenario including the changed assumed variables;

determining an aggregate present value of the plurality of future financial value streams based upon the alternate scenario; and comparing the aggregate present value of the plurality of future financial value streams based upon the alternate scenario to the first aggregate present value of the plurality of future financial value streams based upon the base case scenario.

14. The method according to claim 9 further comprising selecting a stakeholder perspective from among a plurality of stakeholder perspectives for determining the first and second aggregate present value of the plurality of future financial value streams.

15. The method according to claim 9, further comprising selecting two or more stakeholder perspectives from among a plurality of stakeholder perspectives for determining the first and second aggregate present value of the plurality of future financial value streams.

16. The method according to claim 9, wherein the first aggregate present value is determined with respect to a first date and the second aggregate present value is determined with respect to a second date, and the method further comprises:
determining a variance between the first aggregate present value and the second aggregate present value taking into account the time value of money between the first and second dates; and attributing the variance between the first aggregate present value and the second aggregate present value to events that occurred between the first and second dates.

17. A computer-implemented method of processing data relating to the performance of a business enterprise in creating value, comprising:
developing a data structure, by use of a computer system, including one or more assumed variables that have an influence on a future financial value stream of the business enterprise and at least one future or past event linked to each assumed variable that influences the corresponding assumed variable;

determining, by use of the computer system, a first present value of the future financial value stream of the business enterprise with respect to a first point in time as of a first specified date by aggregating the influences on the future financial value stream attributable to the assumed variables and adjusting the future financial value stream for a time value of money;

determining, by use of the computer system, a second present value of the future financial value stream of the business enterprise with respect to a second point in time as of a second specified date by aggregating the influences on the future financial value stream attributable to the assumed variables and adjusting the future financial value stream for a time value of money;

determining, by use of the computer system, a variance between the first present value and the second present value taking into account a time value of money between the first and second dates;

attributing the variance between the first present value and the second present value to events that occurred between the first and second specified dates;

determining a variance between the first present value and the second present value taking into account the time value of money between the first and second points in time; and attributing the variance between the first present value and the second Present value to the occurrence or non-occurrence of events between the first and second points in time.

18. The method according to claim 17, wherein determining a first present value further comprises adjusting the future financial value stream by an assessed probability that the influences on the future financial value stream will be realized, and determining the second present value further comprises adjusting the future financial value stream by an assessed probability that the influences on the future financial value stream will be realized.

19. The method according to claim 17, further comprising selecting a stakeholder perspective from among a plurality of stakeholder perspectives for determining the first and second present values of the future financial value stream.

20. The method according to claim 17, further comprising:
determining a present value of each of a plurality of additional future financial value streams; and aggregating the present value of the future financial value stream and the plurality of additional future financial value streams to form an aggregate present financial value of future financial values streams.

21. A computer-implemented method of processing data relating to the performance of a business enterprise in creating value, comprising:
selecting a stakeholder perspective from among a plurality of stakeholder perspectives for determining a present value of a future financial value stream of the business enterprise;
developing, by use of a computer system, a data structure including one or more assumed variables that have an influence on the future financial value stream of the business enterprise from the perspective of the selected stakeholder and at least one future or past event linked to each assumed variable that influences the corresponding assumption;
determining, by use of the computer system, a present value of the future financial value stream of the business enterprise with respect to a first point in time from the perspective of the selected stakeholder by aggregating the influences on the future financial value stream attributable to the assumed variables and adjusting the future financial value stream for a time value of money;
determining a variance between the first present value and the second present value taking into account the time value of money between the first and second points in time; and
attributing the variance between the first present value and the second Present value to the occurrence or non-occurrence of events between the first and second points in time.

22. The method according to claim 21, wherein determining the present value further comprises adjusting the future financial value stream by an assessed probability that the influences on the future financial value stream will be realized.

23. The method according to claim 21, wherein the future financial value stream is associated with activities of the business enterprise necessary to give rise to the events associated with the future financial value stream.

24. The method according to claim 21, further comprising selecting one or more additional stakeholder perspectives from among the plurality of stakeholder perspectives for determining the first present value of the future financial value stream.

25. The method according to claim 21, further comprising:
determining a present value of the future financial value stream by aggregating influences on the future financial value stream attributable to past events; and
determining a reliability index that is indicative of relative magnitudes of the present value of the future financial value stream attributable to past events and the present value of the future financial value stream attributable to future events.

26. The method according to claim 21, wherein the events and assumed variables collectively form a base case scenario for the business enterprise, and the present value of the future financial value stream is based upon the base case scenario, the method further comprising:
changing one or more of the assumed variables, to form an alternate scenario including the changed assumed variables;
determining the present value of the future financial value stream based upon the alternate scenario; and
comparing the present value of the future financial value stream based upon the alternate scenario to the first present value of the future financial value stream based upon the base case scenario.

27. The method according to claim 21, further comprising:
determining a present value of each of a plurality of additional future financial value streams from the perspective of the selected stakeholder; and
aggregating the present value of the future financial value stream and the plurality of additional future financial value streams to form an aggregate present financial value of future financial values streams.

28. The method according to claim 21, further comprising repeatedly determining and presenting a series of updated present values of the future financial value stream, each updated present value determined from the events and assumed variables in the data structure including any assumed variables that have changed in response to the occurrence or non-occurrence of one or more of the future events.

29. A computer-implemented method of processing data relating to the performance of a business enterprise in creating value, comprising:
developing a data structure, by use of a computer system, including one or more assumed variables that have an influence on a future financial value stream of the business enterprise and at least one future or past event linked to each assumed variable that influences the corresponding assumed variable;
identifying and segregating risks specific to the future financial value stream from risks specific to the business enterprise or industry as a whole;
assigning probabilities to the events or assumed variables based on the identified risks;
determining, by use of the computer system, a first present value of the future financial value stream of the business enterprise with respect to a first point in time by aggregating the influences on the future financial value stream attributable to the assumed variables, adjusting the future financial values stream by the assigned probabilities, and further adjusting the future financial value stream for a time value of money;
receiving as input into the computer system data from a user indicating the occurrence or non-occurrence of one or more of the future events;
determining, by use of the computer system and in response to the occurrence or non-occurrence of one or more of the future events, whether one or more of the assumed variables have changed and whether the influenced future financial value stream has changed;
determining, by use of the computer system, a second present value of the future financial value stream with respect to a second point in time taking into account the one or more assumed variables that changed in response to the occurrence or non-occurrence of the one or more of the future events;
determining a variance between the first present value and the second present value taking into account the time value of money between the first and second points in time; and
attributing the variance between the first present value and the second Present value to the occurrence or non-occurrence of events between the first and second points in time.

30. The method according to claim 29, wherein the future financial value stream is associated with activities of the business enterprise necessary to give rise to the events associated with the future financial value stream.

31. The method according to claim 29, further comprising:
determining a present value of the future financial value stream by aggregating influences on the future financial value stream attributable to past events; and determining a reliability index that is indicative of relative magnitudes of the present value of the future financial value stream attributable to past events and the present value of the future financial value stream attributable to future events.

32. The method according to claim 29, wherein the events and assumed variables collectively form a base case scenario for the business enterprise, and the first present value of the future financial value stream is based upon the base case scenario, the method further comprising:
changing one or more of the assumed variables, to form an alternate scenario including the changed assumed variables;
determining the present value of the future financial value stream based upon the alternate scenario; and
comparing the present value of the future financial value stream based upon the alternate scenario to the first present value of the future financial value stream based upon the base case scenario.

33. The method according to claim 29, further comprising selecting a stakeholder perspective from among a plurality of stakeholder perspectives for determining the first and second present values of the future financial value stream.

34. The method according to claim 29, further comprising selecting two or more stakeholder perspectives from among a plurality of stakeholder perspectives for determining the first and second present values of the future financial value stream.

35. The method according to claim 29, wherein the first present value is determined with respect to a first date and the second present value is determined with respect to a second date, and the method further comprises:
determining a variance between the first present value and the second present value taking into account the time value of money between the first and second dates; and
attributing the variance between the first present value and the second present value to events that occurred between the first and second specified dates.

36. The method according to claim 29, further comprising:
determining a present value of each of a plurality of additional future financial value streams; and
aggregating the present value of the first future financial value stream and the plurality of additional future financial value streams to form an aggregate present financial value of future financial values streams.

37. A computer-implemented method of processing data relating to the performance of a business enterprise in creating value, comprising:
developing, by use of a computer system, a data structure including one or more assumed variables that have an influence on a future financial value stream of the business enterprise and at least one future or past event linked to each assumed variable that influences the corresponding assumed variable;
determining, by use of the computer system, a present value of the future financial value stream of the business enterprise with respect to a first point in time by aggregating the influences on the future financial value stream attributable to the assumed variables and adjusting the future financial value stream for a time value of money, wherein the events and assumed variables collectively form a base case scenario for the business enterprise, and the first present value of the future financial value stream is based upon the base case scenario;
changing one or more of the assumed variables, to form an alternate scenario including the changed assumed variables;
determining, by use of the computer system, the present value of the future financial value stream based upon the alternate scenario;
comparing the present value of the future financial value stream based upon the alternate scenario to the first present value of the future financial value stream based upon the base case scenario;
determining a variance between the first present value and the second present value taking into account the time value of money between the first and second points in time; and
attributing the variance between the first present value and the second Present value to the occurrence or non-occurrence of events between the first and second points in time.

38. The method according to claim 37, wherein determining the present value further comprises adjusting the future financial value stream by an assessed probability that the influences on the financial value stream will be realized.

39. The method according to claim 37, wherein the future financial value stream is associated with activities of the business enterprise necessary to give rise to the events associated with the future financial value stream.

40. The method according to claim 37, further comprising:
determining a present value of the future financial value stream by aggregating influences on the future financial value stream attributable to past events; and
determining a reliability index that is indicative of relative magnitudes of the present value of the future financial value stream attributable to past events and the present value of the future financial value stream attributable to future events.

41. The method according to claim 37, further comprising selecting a stakeholder perspective from among a plurality of stakeholder perspectives for determining the present value of the future financial value stream.

42. The method according to claim 37, further comprising selecting two or more stakeholder perspectives from among a plurality of stakeholder perspectives for determining the present value of the future financial value stream.

43. The method according to claim 37, further comprising:
determining a present value of each of a plurality of additional future financial value streams; and
aggregating the present value of the first future financial value stream and the plurality of additional future financial value streams to form an aggregate present financial value of future financial values streams.

44. A computer-implemented method of processing data relating to the performance of a business enterprise in creating value, comprising:
developing, by use of a computer system, a data structure including one or more assumed variables that have an influence on a future financial value stream of the business enterprise and at least one future or past event linked to each assumed variable that influences the corresponding assumed variables;
determining, by use of the computer system, a first present value of the future financial value stream of the business enterprise with respect to a first point in time by aggregating the influences on the future financial value stream attributable to the assumed variables and adjusting the future financial value stream for a time value of money;
repeatedly determining and presenting a series of updated present values of the future financial value stream, each updated present value determined from the events and assumed variables in the data structure including any assumed variables that have changed in response to the occurrence or non-occurrence of one or more of the future events;

determining a variance between the first present value and the second present value taking into account the time value of money between the first and second points in time; and attributing the variance between the first present value and the second Present value to the occurrence or non-occurrence of events between the first and second points in time.

45. The method according to claim 44, wherein determining the first present value and determining each updated present value further comprise adjusting the future financial value stream by an assessed probability that the influences on the future financial value stream will be realized.

46. The method according to claim 44, wherein the future financial value stream is associated with activities of the business enterprise necessary to give rise to the events associated with the future financial value stream.

47. The method according to claim 44, further comprising:

determining a present value of the future financial value stream by aggregating influences on the future financial value stream attributable to past events; and determining a reliability index that is indicative of relative magnitudes of the present value of the future financial value stream attributable to past events and the present value of the future financial value stream attributable to future events.

48. The method according to claim 44, wherein the events and assumed variables collectively form a base case scenario for the business enterprise, and the first present value of the future financial value stream is based upon the base case scenario, the method further comprising:

changing one or more of the assumed variables, to form an alternate scenario including the changed assumed variables;

determining the present value of the future financial value stream based upon the alternate scenario; and comparing the present value of the future financial value stream based upon the alternate scenario to the first present value of the future financial value stream based upon the base case scenario.

49. The method according to claim 44, further comprising selecting a stakeholder perspective from among a plurality of stakeholder perspectives for determining the first and second present values of the future financial value stream.

50. The method according to claim 44, further comprising selecting two or more stakeholder perspectives from among a plurality of stakeholder perspectives for determining the first and second present values of the future financial value stream.

51. The method according to claim 44, wherein the first present value is determined with respect to a first date and a selected one of the updated present values is determined with respect to a second date, and the method further comprises:

determining a variance between the first present value and the selected updated present value taking into account the time value of money between the first and second dates; and attributing the variance between the first present value and the selected updated present value to events that occurred between the first and second dates.

52. The method according to claim 44, further comprising:

determining a present value of each of a plurality of additional future financial value streams; and aggregating the present value of the first future financial value stream and the plurality of additional future financial value streams to form an aggregate present financial value of future financial values streams.

* * * * *